US007812787B2

(12) United States Patent
Eom

(10) Patent No.: US 7,812,787 B2
(45) **Date of Patent: *Oct. 12, 2010**

(54) LIGHT EMITTING DISPLAY AND DRIVING METHOD THEREOF

(75) Inventor: Ki-Myeong Eom, Suwon-si (KR)

(73) Assignee: Samsung Mobile Display Co., Ltd., Yongin-si (KR)

( * ) Notice: Subject to any disclaimer, the term of this patent is extended or adjusted under 35 U.S.C. 154(b) by 884 days.

This patent is subject to a terminal disclaimer.

(21) Appl. No.: 11/245,324

(22) Filed: Oct. 5, 2005

(65) Prior Publication Data

US 2006/0087478 A1 Apr. 27, 2006

(30) Foreign Application Priority Data

Oct. 25, 2004 (KR) ..................... 10-2004-0085253

(51) Int. Cl.
*G06F 3/38* (2006.01)

(52) U.S. Cl. ........................................ 345/45; 345/204

(58) Field of Classification Search ............. 345/76–83, 345/36, 39, 44–46, 204; 313/463; 315/169.3
See application file for complete search history.

(56) References Cited

U.S. PATENT DOCUMENTS

| | | | | |
|---|---|---|---|---|
| 6,023,260 | A | 2/2000 | Higashi | |
| 6,421,033 | B1 | 7/2002 | Williams et al. | |
| 6,618,031 | B1 | 9/2003 | Bohn, Jr. et al. | |
| 6,707,441 | B1 | 3/2004 | Hebiguchi et al. | |
| 6,958,741 | B2 | 10/2005 | Tsutsui | |
| 7,113,154 | B1 * | 9/2006 | Inukai | 345/76 |
| 7,129,643 | B2 * | 10/2006 | Shin et al. | 315/169.3 |
| 7,215,313 | B2 | 5/2007 | Giraldo et al. | |

(Continued)

FOREIGN PATENT DOCUMENTS

CN 1455914 A 11/2003

(Continued)

OTHER PUBLICATIONS

Patent Abstracts of Japan, Publication No. 2002-352593, dated Dec. 6, 2002, in the name of Shin Fujita.

(Continued)

*Primary Examiner*—Amare Mengistu
*Assistant Examiner*—Vinh T Lam
(74) *Attorney, Agent, or Firm*—Christie, Parker & Hale, LLP

(57) ABSTRACT

A light emitting display device having features of enhanced aperture ratio, yield, and volumetric efficiency of panel space that may be enhanced. The light emitting display device includes—a first driver and a second driver. The first driver sequentially generates selection signals to be applied to selection signal lines of a first group of pixels in each of first and second fields, and sequentially generates first and second light emission control signals to be applied to the first group of pixels in the first and second fields, respectively. The second driver sequentially generates selection signals to be applied to selection signal lines of a second group of pixels in each of the first and second fields, and sequentially generates first and second light emission control signals to be applied to the second group of pixels in the first and second fields, respectively.

22 Claims, 14 Drawing Sheets

U.S. PATENT DOCUMENTS

| | | | | |
|---|---|---|---|---|
| 7,256,775 | B2 * | 8/2007 | Eom | 345/204 |
| 7,365,713 | B2 * | 4/2008 | Kimura | 345/76 |
| 2002/0074551 | A1 * | 6/2002 | Kimura | 257/72 |
| 2002/0163493 | A1 | 11/2002 | Matsushima et al. | |
| 2003/0107560 | A1 | 6/2003 | Yumoto et al. | |
| 2003/0117352 | A1 | 6/2003 | Kimura | |
| 2003/0132931 | A1 | 7/2003 | Kimura et al. | |
| 2003/0189559 | A1 | 10/2003 | Lee et al. | |
| 2003/0227262 | A1 | 12/2003 | Kwon | |
| 2004/0217935 | A1 | 11/2004 | Jeon et al. | |
| 2004/0239658 | A1 | 12/2004 | Koyama et al. | |
| 2005/0237001 | A1 | 10/2005 | Hayafuji | |
| 2005/0259095 | A1 * | 11/2005 | Kwak | 345/204 |
| 2005/0264497 | A1 | 12/2005 | Shin et al. | |
| 2005/0285827 | A1 * | 12/2005 | Eom | 345/76 |
| 2006/0044230 | A1 * | 3/2006 | Eom | 345/76 |

FOREIGN PATENT DOCUMENTS

| | | | |
|---|---|---|---|
| CN | 1458641 | A | 11/2003 |
| CN | 1467696 | | 1/2004 |
| CN | 1577442 | | 2/2005 |
| EP | 1 536 406 | A1 | 6/2005 |
| JP | 62-187887 | | 8/1987 |
| JP | 03-085591 | | 4/1991 |
| JP | 04-355789 | | 12/1992 |
| JP | 09-138659 | | 5/1997 |
| JP | 11-038379 | | 2/1999 |
| JP | 2000-347628 | | 12/2000 |
| JP | 2002-244619 | | 8/2002 |
| JP | 2002-268615 | | 9/2002 |
| JP | 2002-352593 | | 12/2002 |
| JP | 2003-022058 | | 1/2003 |
| JP | 2003-510661 | | 3/2003 |
| JP | 2003-101394 | | 4/2003 |
| JP | 2003-108070 | | 4/2003 |
| JP | 2003-122306 | | 4/2003 |
| JP | 2003-140619 | | 5/2003 |
| JP | 2003-141893 | | 5/2003 |
| JP | 2003-216100 | | 7/2003 |
| JP | 2003-255899 | | 9/2003 |
| JP | 2004-004501 | | 1/2004 |
| JP | 2005-049838 | | 2/2005 |
| JP | 2005-520193 | | 7/2005 |
| KR | 2002-0080002 | | 10/2002 |
| WO | WO 96/24123 | | 8/1996 |
| WO | WO 01/24153 | | 4/2001 |

OTHER PUBLICATIONS

Patent Abstracts of Japan, Publication No. 2003-101394, dated Apr. 4, 2003, in the name of Sho Nagao et al.

Patent Abstracts of Japan, Publication No. 2003-141893, dated May 16, 2003, in the name of Mitsuaki Osame.

European Search Report dated Sep. 6, 2005, for European application 05103853.7, indicating relevance of listed EP 1 536 406 reference in this IDS.

Patent Abstracts of Japan, Publication No. 09-138659, dated May 27, 1997, in the name of Chan-Long Shieh et al.

Patent Abstracts of Japan, Publication No. 2002-244619, dated Aug. 30, 2002, in the name of Munenori Ono et al.

Patent Abstracts of Japan, Publication No. 2003-122306, dated Apr. 25, 2003, in the name of Akira Yumoto.

Patent Abstracts of Japan, Publication No. 2005-049838, dated Feb. 24, 2005, in the name of Dong-Yong Shin.

U.S. Office action dated Sep. 4, 2008, for related U.S. Appl. No. 11/128,924, indicating relevance of listed U.S. references in this IDS.

U.S. Office action dated Apr. 1, 2009, for related U.S. Appl. No. 11/128,924, noting U.S. references listed in this IDS.

U.S. Office action dated Jan. 25, 2010, for related U.S. Appl. No. 11/132,097 noting reference listed in this IDS.

* cited by examiner

LIGHT EMITTING DISPLAY AND DRIVING METHOD THEREOF

CROSS-REFERENCE TO RELATED APPLICATION

This application claims priority to and the benefit of Korean Patent Application No. 10-2004-0085253 filed in the Korean Intellectual Property Office on Oct. 25, 2004, the entire content of which is incorporated herein by reference.

BACKGROUND OF THE INVENTION

1. Field of the Invention

The present invention relates to a light emitting display and more particularly, to an organic light emitting diode (OLED) display using electro-luminescence of an organic material.

2. Description of the Related Art

Typically, a light emitting display device is realized as an organic light emitting diode (OLED) display utilizing electro-luminescence of an organic material, and it realizes an image by driving organic light emitting devices arranged in an N×M matrix pattern in a current driving or voltage driving scheme.

Such an organic light emitting device is also referred to as an OLED due to its diode characteristics, and it is configured to have an anode (e.g., ITO or metal), an organic thin film, and a cathode electrode layer (e.g., metal). The organic thin film is formed in a multi-layered structure including an emission layer (EML), an electron transport layer (ETL), and a hole transport layer (HTL) so as to increase light emitting efficiency by balancing electron and hole concentrations. In addition, it may include an electron injection layer (EIL) and a hole injection layer (HIL) separately.

The organic light emitting devices are arranged in an N×M matrix format so as to form an OLED panel.

An OLED display that has such organic light emitting devices is typically configured in a passive matrix configuration or an active matrix configuration using thin film transistors (TFTs) or metal-oxide semiconductor field-effect transistors (MOSFETs). In the passive matrix configuration, organic light emitting devices are formed between anode lines and cathode lines that cross each other, and they are driven by driving the anode and cathode lines. In the active matrix configuration, each organic light emitting device is coupled to a TFT usually through a pixel electrode and is driven by controlling a gate voltage of a corresponding TFT.

A typical pixel circuit for an active matrix OLED (AMOLED) display will hereinafter be described in detail.

FIG. 1 illustrates an equivalent circuit of a pixel circuit for an exemplary pixel located in a first row and a first column among N×M pixels.

As shown in FIG. 1, a pixel 10 includes three subpixels 10*r*, 10*g*, and 10*b*, and the subpixels 10*r*, 10*g*, and 10*b* respectively include organic light emitting diodes OLEDr, OLEDg, and OLEDb that respectively emit red R, green G, and blue B lights. In a striped arrangement of subpixels, the subpixels 10*r*, 10*g*, and 10*b* are respectively coupled to separate data lines D1*r*, D1*g*, and D1*b*, and they are coupled in common to a selection signal line S1.

The red subpixel 10*r* includes two transistors M1*r* and M2*r* and a capacitor C1*r* for driving the organic light emitting diode OLEDr. In the same way, the green subpixel 10*g* includes two transistors M1*g* and M2*g* and a capacitor C1*g*, and the blue subpixel 10*b* includes two transistors M1*b* and M2*b* and a capacitor C1*b*.

The subpixels 10*r*, 10*g*, and 10*b* operate in the same way, and thus, only an operation of the subpixel 10*r* will be hereinafter described in detail as a representative example.

A driving transistor M1*r* is coupled between a source voltage VDD and an anode of the organic light emitting diode OLEDr so that a current can flow to the organic light emitting diode OLEDr for light emitting thereof, and a cathode of the organic light emitting diode OLEDr is coupled to a source voltage VSS that is lower than the source voltage VDD. The current of the driving transistor M1*r* is controlled by a data voltage applied through a switching transistor M2*r*. A capacitor C1*r* is connected between a source of the transistor M1*r* and a gate thereof so as to maintain an applied voltage thereto for a predetermined time. A gate of the switching transistor M2*r* is connected to a selection signal line S1 that delivers a selection signal and a source thereof is connected to a data line D1*r* that delivers a data voltage for the red subpixel 10*r*.

When the switching transistor M2*r* is turned on according to a selection signal applied to the gate of the switching transistor M2*r*, a data voltage $V_{DATA}$ from the data line D1*r* is applied to the gate of the transistor M1*r*. Then the current $I_{OLED}$ flows to a drain of the transistor M1*r* depending on the voltage $V_{GS}$ of the capacitor C1*r* charged between the gate and the source of the transistor M1*r* and the organic light emitting diode OLEDr emits light depending on the current $I_{OLED}$. In this case, the current $I_{OLED}$ flowing through the organic light emitting diode OLEDr is expressed as the following equation 1.

$$I_{OLED} = \frac{\beta}{2}(V_{GS} - V_{TH})^2 = \frac{\beta}{2}(V_{DD} - V_{DATA} - |V_{TH}|)^2 \quad \text{(Equation 1)}$$

Here, $V_{TH}$ denotes a threshold voltage of the transistor M1*r* and β is a constant.

In the pixel circuit shown in FIG. 1, a current corresponding to the applied data voltage is applied to the organic light emitting diode OLEDr and the organic light emitting diode OLEDr emits light with a brightness corresponding to the applied current. The applied data voltage has multiple-stage values within a predetermined range so as to express grayscales.

As described above, one pixel 10 of the OLED display includes three subpixels 10*r*, 10*g*, and 10*b* and each subpixel is provided with a driving transistor, a switching transistor, and a capacitor, for driving an OLED. In addition, each subpixel is provided with a data line for delivering a data signal and a power line for delivering the source voltage VDD. As described above, since many electrical lines are required for driving a pixel, it is difficult to accommodate them within a pixel area and an aperture ratio corresponding to a light emitting area in the pixel area may be decreased. Therefore, development of a pixel circuit that has a reduced number of electrical lines and elements for driving a pixel is highly desired.

The information disclosed in this Background of the Invention section is only for enhancement of understanding of the background of the invention and therefore, unless explicitly described to the contrary, it should not be taken as an acknowledgement or any form of suggestion that this information forms the prior art that is already known in this country to a person of ordinary skill in the art.

SUMMARY OF THE INVENTION

An aspect of the present invention provides a light emitting display device having features of enhanced aperture ratio, yield, and volumetric efficiency of panel space by commonly coupling a plurality of light emitting elements to a pixel driving element so as to reduce the number of lines and elements.

Another aspect of the present invention provides a light emitting display device including a driving apparatus for applying signals for a plurality of light emitting elements commonly coupled to a pixel driving element to sequentially emit light, and a method for driving such a light emitting display device.

A light emitting display device according to an exemplary embodiment of the present invention includes a plurality of selection signal lines for transmitting selection signals, a plurality of data lines for transmitting data signals, and first and second groups of pixels, each of the pixels being coupled to a corresponding one of the selection signal lines and a corresponding one of the data lines.

Each of the pixels includes a pixel driver, first and second switches, and first and second light emitting elements. The pixel driver outputs, through an output terminal, an output current corresponding to a corresponding one of the data signals in response to a corresponding one of the selection signals. The first and second switches are electrically coupled to the output terminal of the pixel driver and selectively transmit the output current of the pixel driver in response to first and second light emission control signals. The first and second light emitting elements respectively emit light corresponding to the output current from the first and second switches.

The light emitting display device further includes a first driver and a second driver. The first driver sequentially generates the selection signals to be applied to the selection signal lines of the first group of pixels in each of first and second fields, sequentially generates the first light emission control signals to be applied to the first group of pixels in the first field, and sequentially generates the second light emission control signals to be applied to the first group of pixels in the second field. The second driver sequentially generates the selection signals to be applied to the selection signal lines of the second group of pixels in each of the first and second fields, sequentially generates the first light emission control signals to be applied to the second group of pixels in the first field, and sequentially generates the second light emission control signals to be applied to the second group of pixels in the second field.

In a further embodiment, the first driver includes a first shift register, a first circuit, a second shift register, and a second circuit. The first shift register shifts a first signal having a first pulse by a first period to sequentially generate a plurality of first shifted signals. The first circuit outputs the selection signals for the first group of pixels, each of the selection signals having a second pulse, while a first enable signal, a corresponding one of the first shifted signals, and another one of the first shifted signals that is shifted from the corresponding one of the first shifted signals by the first period, have a high level or a low level corresponding to a level of the first pulse. The second shift register shifts a second signal having a third pulse by a second period to sequentially generate a plurality of second shifted signals. The second circuit outputs the corresponding one of the first shifted signals having the first pulse as a corresponding one of the first light emission control signals for the first group of pixels while the third pulse of a corresponding one of the second shifted signals is applied, and outputs the corresponding one of the first shifted signals having the first pulse as a corresponding one of the second light emission control signals for the first group of pixels while the third pulse of the corresponding one of the second shifted signals is not applied.

In a further embodiment, the second driver includes a third shift register, a third circuit, a fourth shift register, and a fourth circuit. The third shift register shifts the first signal having the first pulse by the first period to sequentially generate a plurality of third shifted signals. The third circuit outputs the selection signals for the second group of pixels, each of the selection signals having the second pulse while a second enable signal, a corresponding one of the third shifted signals, and another one of the third shifted signals that is shifted from the corresponding one of the third shifted signals by the first period, have a high level or a low level corresponding to a level of the first pulse. The fourth shift register shifts the second signal having the third pulse by the second period to sequentially generate a plurality of fourth shifted signals. The fourth circuit outputs the corresponding one of the third shifted signals having the first pulse as a corresponding one of the first light emission control signals for the second group of pixels while the third pulse of a corresponding one of the fourth shifted signals is applied, and outputs the corresponding one of the third shifted signals having the first pulse as a corresponding one of the second light emission control signals for the second group of pixels while the third pulse of the corresponding one of the fourth shifted signals is not applied.

In a further embodiment, a frequency of the first enable signal is twice that of a clock signal input to the first shift register. In a further embodiment, the second enable signal is an inverted signal of the first enable signal.

In a further embodiment, the first circuit includes a NAND gate for receiving the first enable signal, the corresponding one of the first shifted signals, and the another one of the first shifted signals that is shifted from the corresponding one of the first shifted signals by the first period.

In a further embodiment, the second circuit includes a NAND gate and an inverter. The NAND gate receives the corresponding one of the second shifted signals and an inverted signal of the corresponding one of the first shifted signals. The inverter outputs, as the corresponding one of the second light emission control signals, an inverted signal of an output signal from a NOR gate for receiving the corresponding one of the first shifted signals and the corresponding one of the second shifted signals.

In a further embodiment, one of the data signals corresponding to the first light emitting element is transmitted to the corresponding one of the data lines while the second pulse of the corresponding one of the selection signals is applied in the first field, and another one of the data signals corresponding to the second light emitting element is transmitted to the corresponding one of the data lines while the second pulse of the corresponding one of the selection signals is applied in the second field.

In a further embodiment, the first group of pixels correspond to odd numbered lines of the plurality of selection signal lines, the first light emission control signal lines, and the second light emission control signal lines, and the second group of pixels correspond to even numbered lines of the plurality of selection signal lines, the first light emission control signal lines, and the second light emission control signal lines.

A light emitting display panel according to another exemplary embodiment of the present invention is formed on a substrate, and it includes first and second groups of selection signal lines, first and second groups of first and second light emission control signal lines, a first driver, and a second driver. The first and second groups of selection signal lines transmit selection signals. The first and second groups of first and second light emission control signal lines transmit first and second light emission control signals. The first driver generates the selection signals and the first and second light emission control signals to be respectively applied to the first group of the selection signal lines and the first group of the first and second light emission control signal lines. The second driver generates the selection signals and the first and second light emission control signals to be respectively applied to the second group of the selection signal lines and the second group of the first and second light emission control signal lines.

A method for driving a light emitting display device according to another exemplary embodiment of the present invention is used to drive a light emitting display device that includes a plurality of selection signal lines including first and second selection signal lines for respectively transmitting first and second selection signals, a plurality of data lines for transmitting data signals, and a plurality of pixels including first and second pixels respectively connected to the first and second selection signal lines and the data lines.

Each of the first and second pixels includes a pixel driver and first and second switches. The pixel driver outputs, through an output terminal, an output current corresponding to a corresponding one of the data signals in response to a first level of an applied one of the selection signals. The first and second switches are respectively coupled between the output terminal of the pixel driver and first and second light emitting elements and selectively transmit the output current of the pixel driver in response to a second level of first and second light emission control signals, wherein the first and second light emitting elements emit light corresponding to the output current selectively transmitted by the first and second switches.

In this case, the exemplary method includes applying the first selection signal having the first level to the pixel driver for the first pixel, applying the second selection signal having the first level to the pixel driver for the second pixel, and simultaneously applying the first light emission control signal having the second level to the first and second pixels.

In a further embodiment, the first light emission control signal having a third level that is an inverted level of the second level is applied to the first and second pixels while applying the first selection signal to the pixel driver for the first pixel and the second selection signal having the first level to the pixel driver for the second pixel. In a further embodiment, the second light emission control signal having a third level is applied to the first and second pixels while applying the first selection signal to the pixel driver for the first pixel and the second selection signal having the first level to the pixel driver for the second pixel.

In a further embodiment, the second light emission control signal having the third level is applied to the first and second pixels while simultaneously applying the first light emission control signal having the second level to the first and second pixels.

DETAILED DESCRIPTION

Exemplary embodiments of the present invention will hereinafter be described in detail with reference to the accompanying drawings.

In the following detailed description, only certain exemplary embodiments of the present invention are shown and described, simply by way of illustration. As those skilled in the art would realize, the described embodiments may be modified in various different ways, all without departing from the spirit or scope of the present invention.

In the following description, a "current selection signal line" denotes a selection signal line that currently delivers a selection signal and a "previous selection signal line" denotes a selection signal line that has previously delivered a selection signal before the current selection signal. In addition, a "current pixel" denotes a pixel that emits light in response to the selection signal of the current selection signal line, and a "previous pixel" denotes a pixel that emits light in response to the selection signal of the previous selection signal line.

Figure 1:
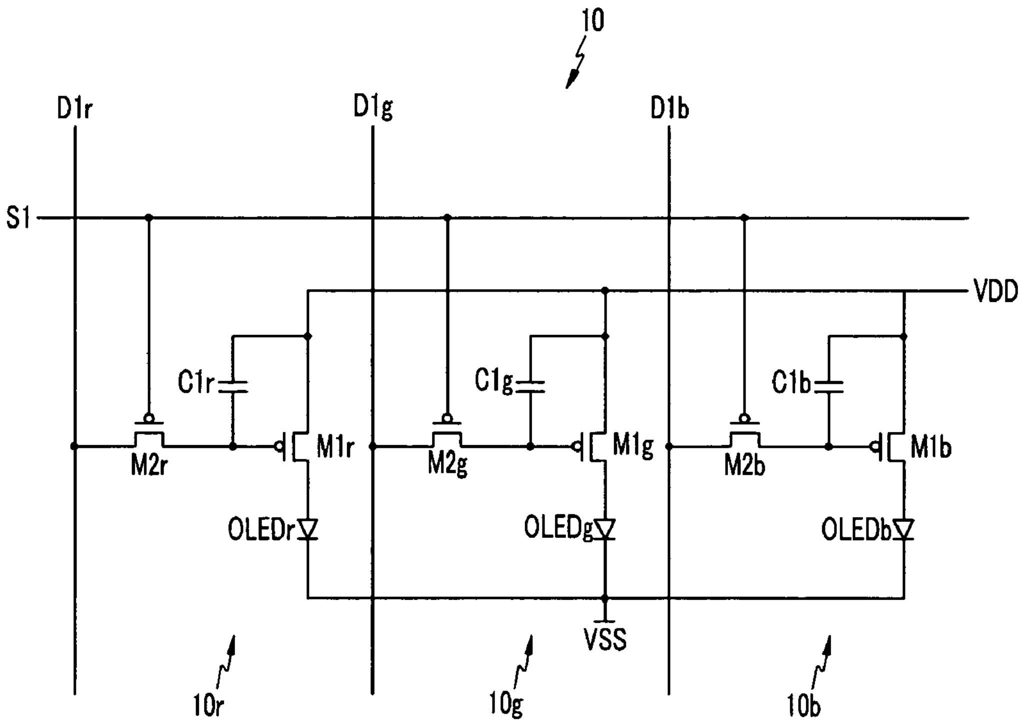
FIG. 1 illustrates an equivalent circuit of a pixel circuit of an OLED display.
Figure 2:
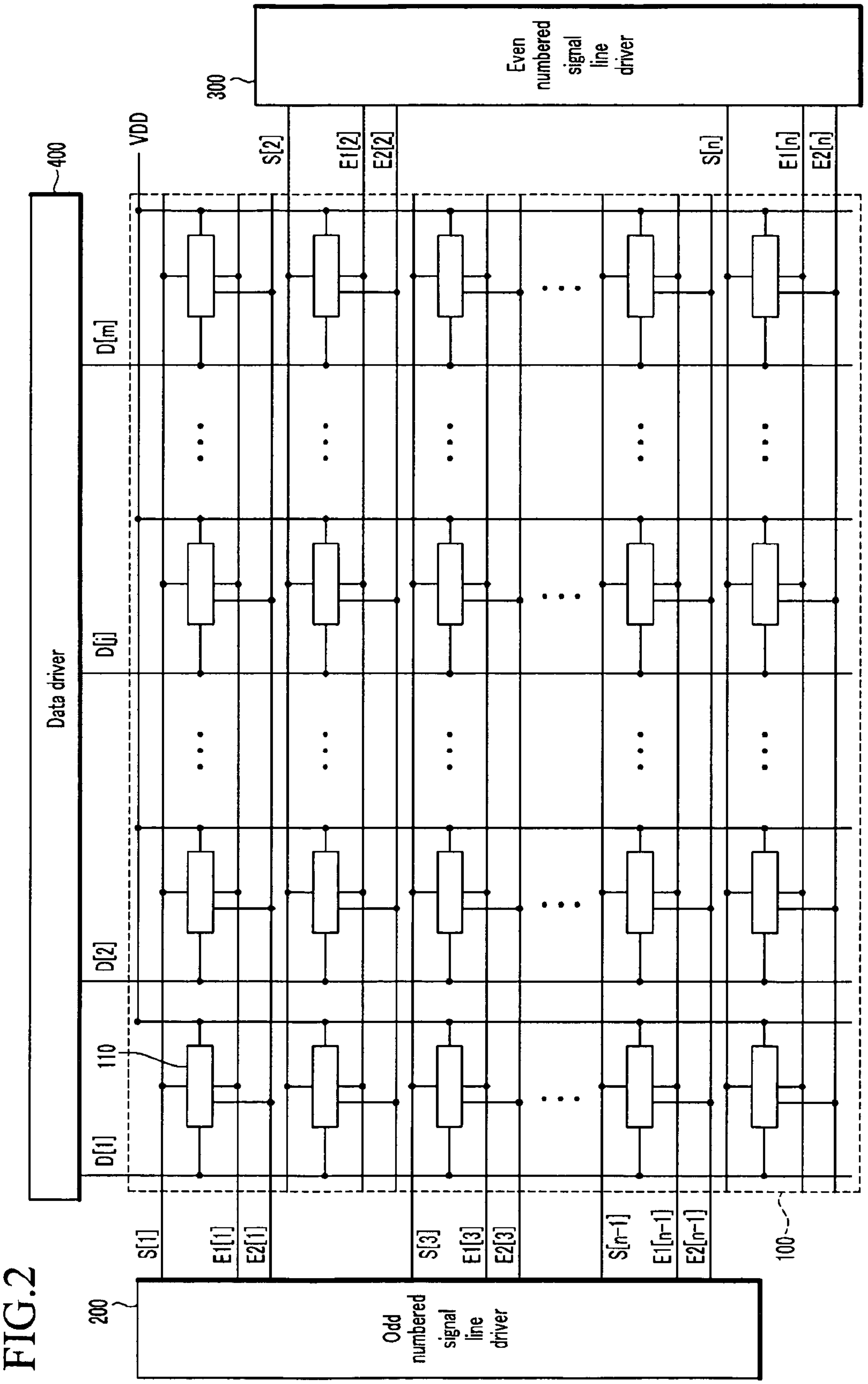
FIG. 2 is a top plan view that schematically shows a configuration of an OLED display according to an exemplary embodiment of the present invention.

FIG. 2 is a top plan view that schematically shows a configuration of an OLED display according to an exemplary embodiment of the present invention.

As shown in FIG. 2, an OLED display according to an exemplary embodiment of the present invention includes a display panel 100, an odd numbered signal line driver 200, an even numbered signal line driver 300, and a data driver 400.

The display panel 100 includes selection signal lines S[i] and light emission control signal lines E1[*i*] and E2[*i*] respectively extending in a row direction, data lines D[j] extending in a column direction, n source lines VDD, and n×m pixels 110. Here, the index "i" takes a natural number from 1 to n and the index "j" takes a natural number from 1 to m.

Each pixel 110 is formed in a pixel area formed by two adjacent selection signal lines S[i−1] and S[i] and two adjacent data lines D[j−1] and D[j], and it includes two OLEDs among red (R), green (G), and blue (B) OLEDs. The two OLEDs included in the pixel 110 are driven to time-divisionally emit light corresponding to a data signal from a data line D[j], in response to signals received from a current selection signal line S[i], a previous selection signal line S[i−1], and light emission control signal lines E1[*i*] and E2[*i*].

Light emission of the two OLEDs is respectively controlled by the two light emission control signal lines E1[*i*] and E2[*i*], and light emission control signals applied through the two light emission control signal lines E1[*i*] and E2[*i*] are controlled such that the two OLEDs alternately emit light in one frame.

An odd numbered signal line driver 200 generates selection signals and sequentially applies them to odd numbered signal lines (i.e., selection signal lines S[1], S[3], S[5], . . . , S[n−1]) among the n selection signal lines S[i] such that pixels of corresponding lines may be applied with data signals. In addition, the odd numbered signal line driver 200 generates light emission control signals and sequentially applies them to odd numbered signal lines (i.e., light emission control signal lines E1[1], E1[3], E1[5], . . . , E1[n−1] and light emission control signal lines E2[1], E2[3], E2[5], . . . , E2[n−1]) among the light emission control signal lines E1[*i*] and E2[*i*] such that organic light emitting diodes OLED1 and OLED2 (shown in FIG. 3) of pixels of corresponding lines may selectively emit light.

An even numbered signal line driver 300 generates selection signals and sequentially applies them to even numbered signal lines (i.e., selection signal lines S[2], S[4], S[6], . . . , S[n]) among the n selection signal lines S[i] such that pixels of corresponding lines may be applied with data signals. In addition, the even numbered signal line driver 300 generates light emission control signals and sequentially applies them to even numbered signal lines (i.e., light emission control signal lines E1[2], E1[4], E1[6], . . . , E1[n] and light emission control signal lines E2[2], E2[4], E[2], . . . , E2[*n*]) among the light emission control signal lines E1[*i*] and E2[*i*] such that the light emitting diodes OLED1 and OLED2 of pixels of corresponding lines may selectively emit light.

When the selection signals are sequentially applied to the selection signal lines, a data driver 400 applies data signals to the data lines D[1]-D[m] of the pixels on the signal lines applied with the selection signals.

According to the present exemplary embodiment, the data driver 400 and the odd and even numbered signal line drivers 200 and 300 are respectively coupled to a substrate of the display panel 100. Further, the data driver 400 and the odd and even numbered signal line drivers 200 and 300 may be mounted on the glass substrate. In addition, they may be formed as driving circuits on the same layer as the layers in which the selection signal lines S[i], the data lines D[i], and the transistors of the pixel circuits are formed on the substrate of the display panel 100. The data driver 400 and the odd and even numbered signal line drivers 200 and 300 may also be mounted as a chip on tape carrier package (TCP), a flexible printed circuit (FPC), or a tape automatic bonding (TAB) attached and electrically coupled to the substrate of the display panel 100.

In addition, according to an exemplary embodiment of the present invention, each frame is time-divisionally driven as two fields, and two of red, green, and blue data are programmed in the two fields so as to realize the light emitting of the corresponding colors. For such an operation, the signal line drivers 200 and 300 sequentially send selection signals to the select signal lines S[i] during each field, and they sequentially apply the light emission control signals to corresponding light emission control signal lines E1[*i*] and E2[*i*] such that the two OLEDs included in one pixel may emit light during a corresponding field. In addition, the data driver 300 applies the R, G, and B data signals to a corresponding data line D[j] during each field.

Hereinafter, the pixel 110 according to a first exemplary embodiment of the present invention will be described in detail with reference to FIG. 3.

Figure 3:
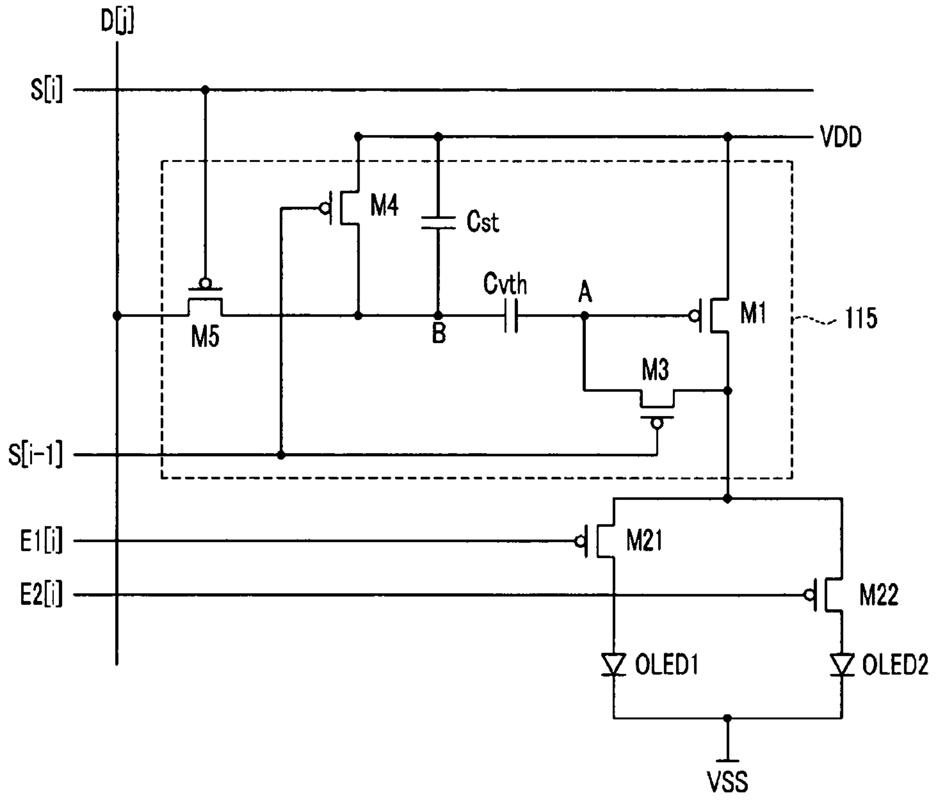
FIG. 3 is an equivalent circuit of one pixel circuit according to a first exemplary embodiment of the present invention.

FIG. 3 is a circuit diagram showing a pixel of an OLED display according to a first exemplary embodiment of the present invention. FIG. 3 illustrates an example of a pixel that utilizes the electro-luminescence of an organic material. For better understanding and ease of description, FIG. 3 shows a pixel formed in a pixel area formed by the selection signal line S[i] of an i-th row and the data line D[j] of a j-th column (here, i denotes an integer between 1 and n, and j denotes an integer between 1 and m). Hereinafter, for better understanding and ease of description, the light emission control signals applied to the light emission control signal lines E1[*i*] and E2[*i*] are denoted as the same symbols E1[*i*] and E2[*i*] as for light emission control signal lines, and the selection signal applied to the selection signal line S[i] is denoted as the same symbol S[i] as the selection signal line. The light emitting diodes OLED1 and OLED2 in the pixel 110 are two of a red (R) OLED, a green (G) OLED, and a blue (B) OLED, and all the transistors M1, M21, M22, M3, M4, and M5 of the pixel 110 are illustrated as p-channel transistors. In other embodiments one or more of these transistors may be n-type transistors or any other suitable types of transistors. Those skilled in the art would know the different levels and polarities of the voltages and signals to apply for different types of transistors.

As shown in FIG. 3, the pixel circuit 110 includes a pixel driver 115, two light emitting diodes OLED1 and OLED2, and transistors M21 and M22 for controlling the two light emitting diodes OLED1 and OLED2 to selectively emit light.

The pixel driving circuit 115 is coupled to the selection signal line S[i] and the data line D[j], and generates a current to be applied to the light emitting diodes OLED1 and OLED2 corresponding to the data signal supplied through the data line D[j]. In the present embodiment, the pixel driving circuit 115 includes four transistors and two capacitors, that is, the transistors M1, M3, M4, M5 and the capacitors Cvth and Cst. However, it should be understood that the present invention is not limited to the specific pixel driving circuit having four transistors and two capacitors, and any variation of the pixel driving circuit capable of producing currents to be applied to the light emitting diodes OLED1 and OLED2 should be regarded as being within the scope of the present invention.

In more detail, the transistor M5 has its gate connected to the current selection signal line S[i] and its source connected to the data line D[j], and transmits a data voltage applied through the data line D[j] to a node B of the capacitor Cvth, in response to the selection signal applied to the selection signal line S[i]. The transistor M4 directly connects the node B of the capacitor Cvth to the source voltage VDD when the selection signal is applied to the previous selection signal line S[i−1]. The transistor M3 forms a diode-connection of the transistor M1 when the selection signal is applied to the previous selection signal line S[i−1]. The driving transistor M1 that drives the light emitting diodes OLED1 and OLED2 has its gate connected to a node A of the capacitor Cvth and its source connected to the source voltage VDD. The driving transistor M1 controls the current to be applied to the light emitting diodes OLED1 and OLED2 according to the voltage applied to its gate.

In addition, the capacitor Cst has its first electrode connected to the source voltage VDD and its second electrode connected to a drain electrode (i.e., the node B) of the transistor M4. The capacitor Cvth has its first electrode connected to the second electrode of the capacitor Cst such that the two capacitors may be coupled in series, and it has its second electrode connected to the gate (i.e., node A) of the driving transistor M1.

In addition, a drain of the driving transistor M1 is connected to sources of the transistors M21 and M22 that respectively control the light emitting diodes OLED1 and OLED2 to emit light, and gates of the transistors M21 and M22 are respectively connected to the light emission control signal lines E1[*i*] and E2[*i*]. Drains of the transistors M21 and M22 are respectively connected to anodes of the light emitting diodes OLED1 and OLED2, and cathodes of the light emitting diodes OLED1 and OLED2 are applied with a source voltage VSS that is lower than the source voltage VDD. By way of example, a negative voltage or a ground voltage may be used as such a source voltage VSS.

Although a selection signal line S[0] may be formed as a 0-th row on the display panel 100 for a pixel circuit formed by the selection signal line S[1] in the first row in the same configuration shown in FIG. 3, such a selection signal line S[0] of the 0-th row is not illustrated on the display panel shown in FIG. 2.

Figure 4:
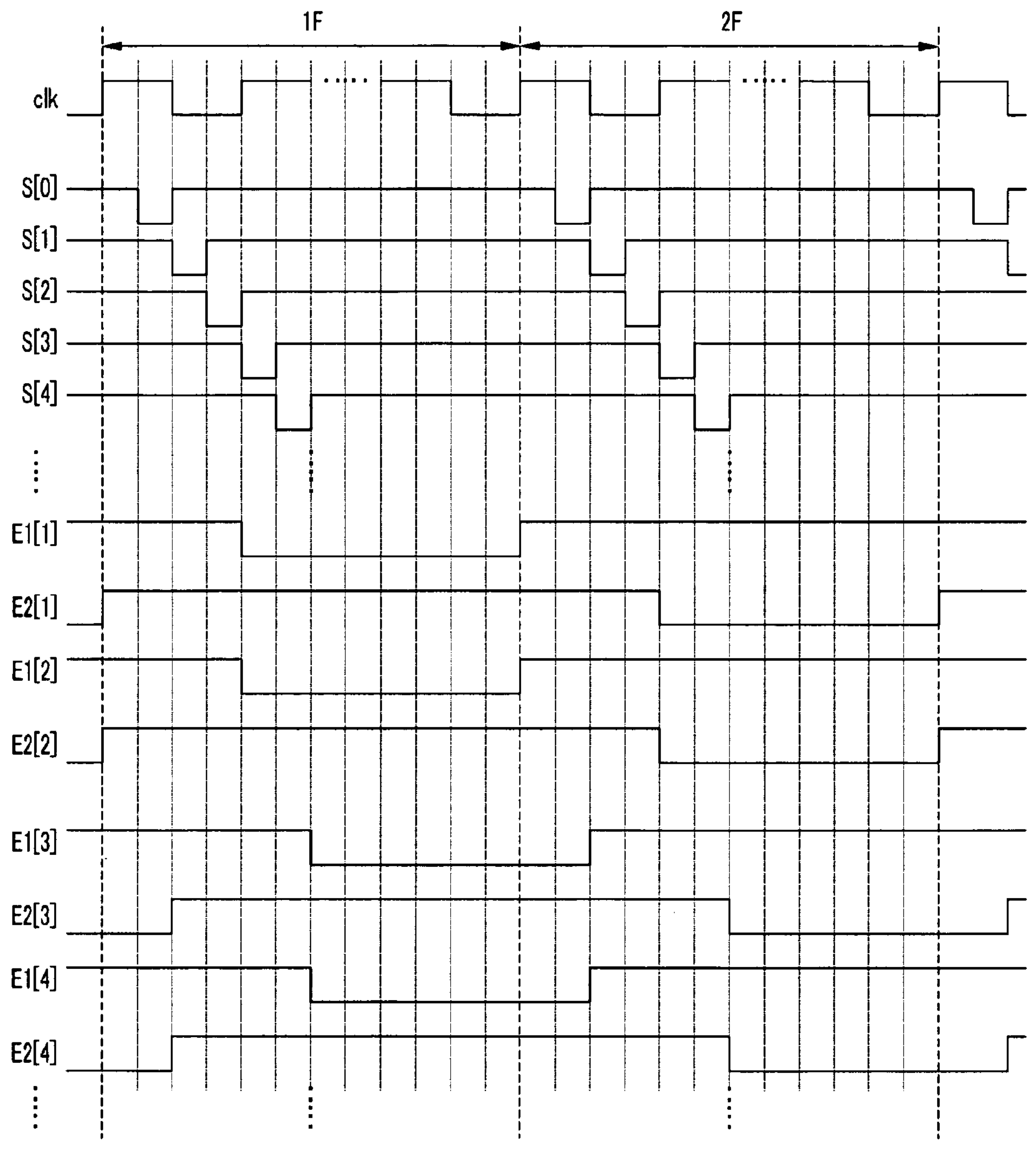
FIG. 4 is a signal timing diagram of an OLED display according to the first exemplary embodiment of the present invention.

A driving method of an OLED display according to the first exemplary embodiment of the present invention will be described in detail with reference to FIG. 4. FIG. 4 is a signal timing diagram of an OLED display according to the first exemplary embodiment of the present invention.

As shown in FIG. 4, in an OLED display according to the first exemplary embodiment of the present invention, each frame is dividedly driven as two fields 1F and 2F, and the selection signals are sequentially applied in the respective fields 1F and 2F. The two light emitting diodes OLED1 and OLED2 sharing the driving circuit 115 respectively emit light for a period of a corresponding field. The fields 1F and 2F are independently defined for each row, and FIG. 4 illustrates them based on the selection signal line S[1] in the first row.

In the first field 1F, the transistors M3 and M4 are turned on when a selection signal having a low level is applied to the previous selection signal line S[0]. Since the transistor M3 is turned-on, the transistor M1 becomes diode-connected. Therefore, a voltage difference between the gate and the source of the transistor M1 changes to a threshold voltage Vth of the transistor M1. Since the source of the transistor M1 is connected to the voltage source VDD, the gate of the transistor M1 (i.e., the node A of the capacitor Cvth) becomes a sum of the source voltage VDD and the threshold voltage Vth. In addition, since the transistor M4 is turned on such that the node B of the capacitor Cvth is applied with the source voltage VDD, a voltage $V_{Cvth}$ charging the capacitor Cvth may be obtained as the following equation 2.

$$V_{Cvth}V_{CvthA}-V_{CvthB}=(VDD+Vth)-VDD=Vth \qquad \text{(Equation 2)}$$

Here, $V_{Cvth}$ denotes the voltage charging the capacitor Cvth, $V_{CvthA}$ denotes a voltage applied to the node A of the capacitor Cvth, and $V_{CvthB}$ denotes a voltage applied to the node B of the capacitor Cvth.

When a selection signal having a low level is applied to the current selection signal line S[1], the transistor M5 is turned on such that the data voltage Vdata applied from the data line D1 is applied to the node B. In addition, since the capacitor Cvth is charged with a voltage corresponding to the threshold voltage Vth of the transistor M1, the gate of the transistor M1 receives a voltage corresponding to a sum of the data voltage Vdata and the threshold voltage Vth of the transistor M1. That is, a gate-source voltage Vgs of transistor M1 may be expressed as the following equation 3.

$$Vgs=(Vdata+Vth)-VDD \qquad \text{(Equation 3)}$$

When a selection signal having the low level is applied to the current selection signal line S[1], both the light emission control signals E1[1] and E2[1] are controlled to be at a high level. Therefore, the transistors M21 and M22 are turned off such that a leakage current is prevented from flowing through the light emitting diodes OLED1 and OLED2.

When a selection signal having a high level is applied to the current selection signal line S[1] after the selection signal having the low level, a light emission control signal having a low level is applied to the light emission control signal line E1[1] such that the transistor M21 is turned on. Therefore, a current $I_{OLED}$ corresponding to the gate-source voltage Vgs of the transistor M1 is supplied to the light emitting diode OLED1, and accordingly the light emitting diode OLED1 emits light. The current $I_{OLED}$ may be expressed as the following equation 4.

$$I_{OLED}=\frac{\beta}{2}(Vgs-Vth)^2=\frac{\beta}{2}((Vdata+Vth-VDD)-Vth)^2=\frac{\beta}{2}(VDD-Vdata)^2 \qquad \text{(Equation 4)}$$

Here, $I_{OLED}$ denotes the current flowing through the light emitting diode OLED1, Vgs denotes the voltage between the source and the gate of the transistor M1, Vth denotes the threshold voltage of the transistor M1, Vdata denotes the data voltage, and β denotes a constant value.

In the second field 2F, when a selection signal having a low level is applied to the previous selection signal line S[0], the capacitor Cvth is charged with the voltage $V_{Cvth}$ the same as in the case of the first field 1F. Then, when a selection signal having a low level is applied to the current selection signal line S[1], the transistor M5 is turned on such that the data voltage Vdata applied from the data line D1 is applied to the node B.

In addition, when the selection signal having the low level is applied to the current selection signal line S[1], both the light emission control signals E1[1] and E2[1] are controlled to be at a high level. Therefore, the transistors M21 and M22 are turned off such that a leakage current is prevented from flowing through the light emitting diodes OLED1 and OLED2.

When a selection signal having a high level is applied to the current selection signal line S[1], a light emission control signal having a low level is applied to the light emission control signal line E2[1] such that the transistor M22 is turned on. Therefore, a current $I_{OLED}$ corresponding to the gate-source voltage Vgs of the transistor M1 is supplied to the light emitting diode OLED2, and accordingly the light emitting diode OLED2 emits light.

As such, the light emitting diode OLED1 emits light in the first field 1F, since the light emission control signal E1[1] has the low level and the light emission control signal E2[1] has the high level. However, the light emitting diode OLED2 emits light in the second field 2F, since the light emission control signal E1[1] has the high level and the light emission control signal E2[1] has the low level.

Figure 5:
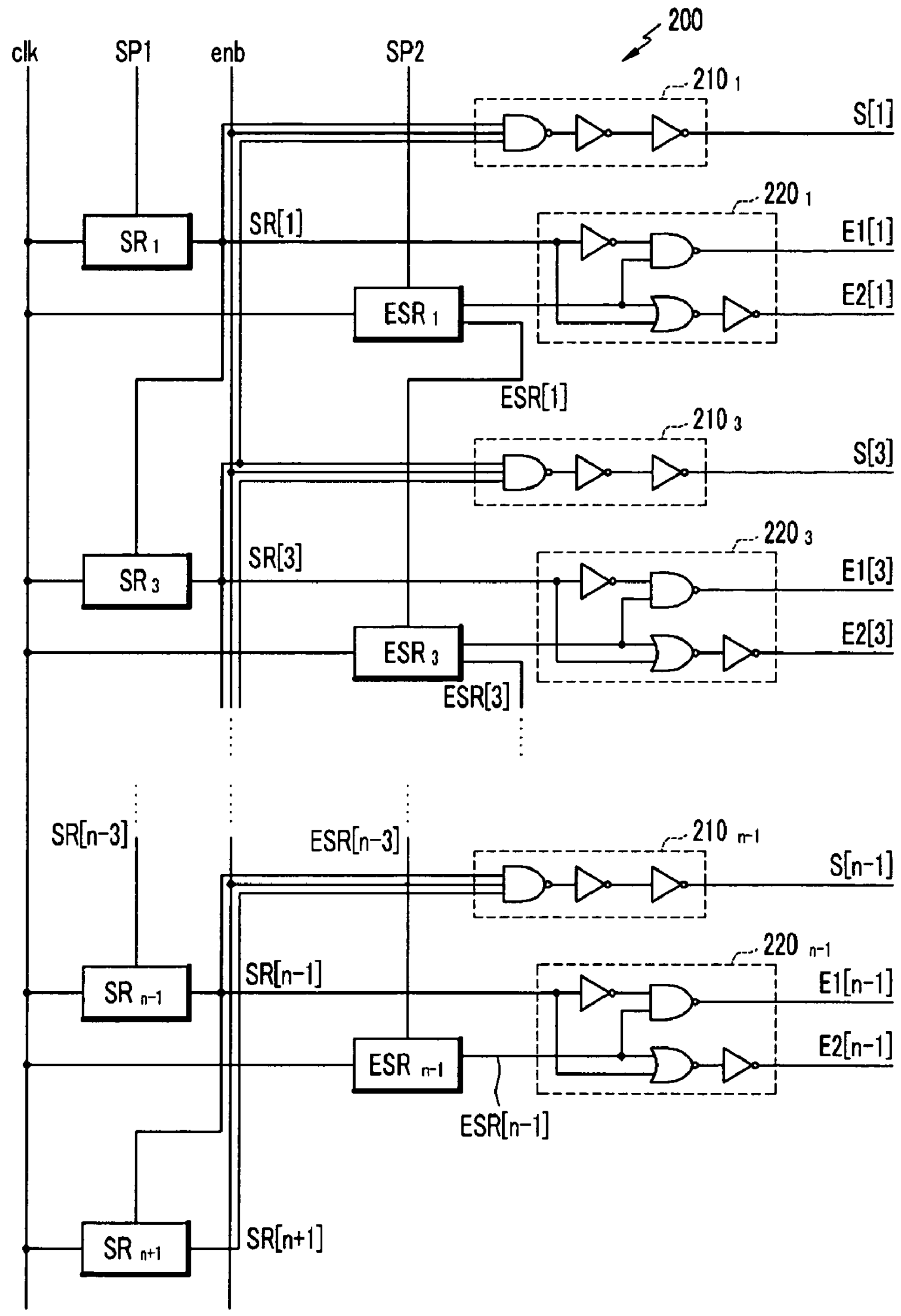
FIG. 5 schematically illustrates an odd numbered signal line driver of an OLED display according to the first exemplary embodiment of the present invention.
Figure 6:
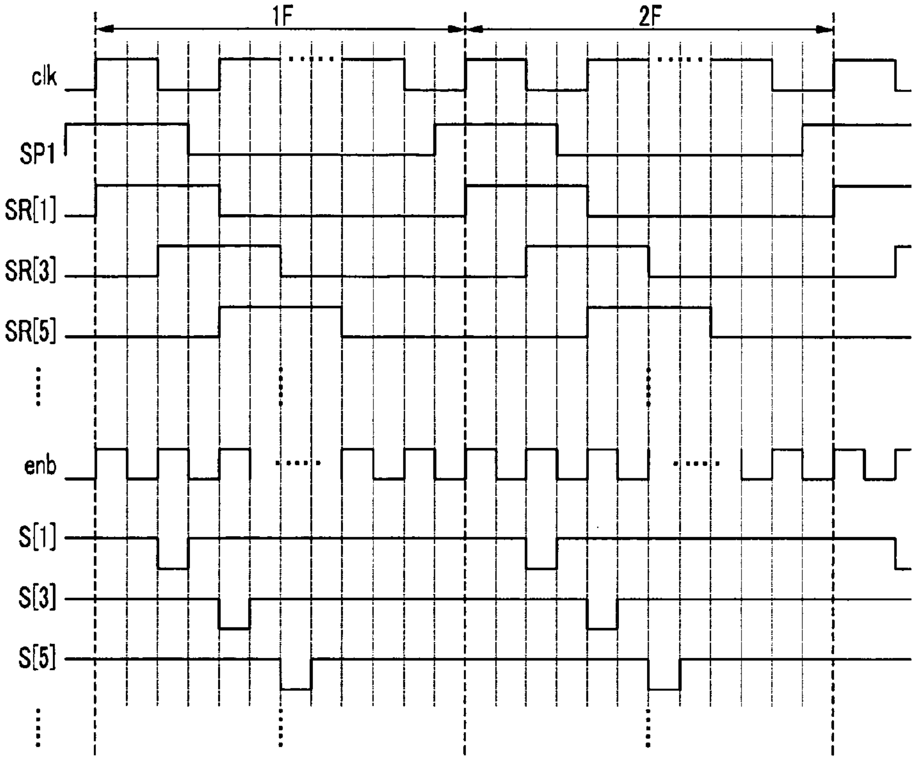
FIG. 6 is a waveform diagram showing output waveforms of the odd numbered signal line driver of FIG. 5.
Figure 7:
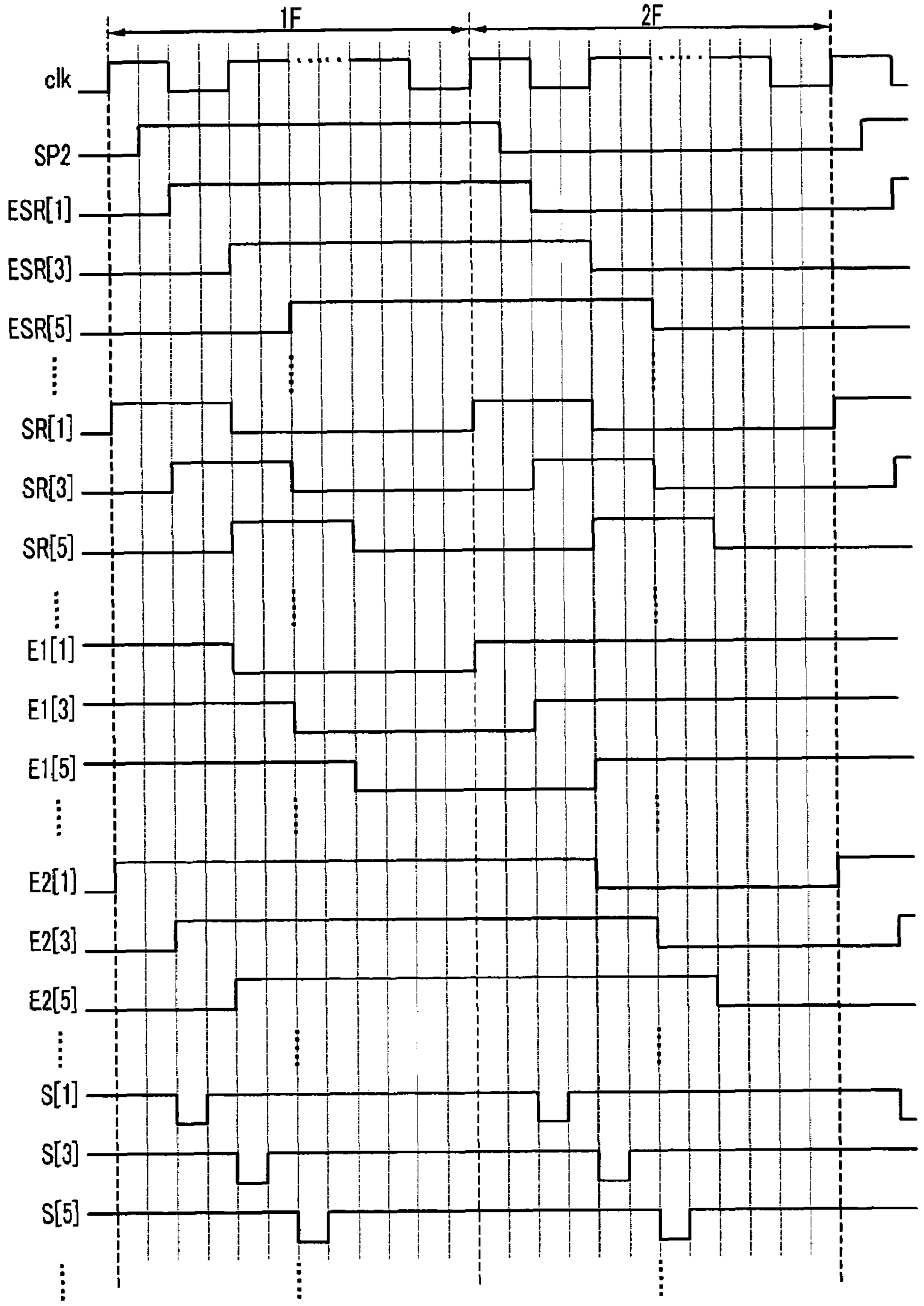
FIG. 7 is a waveform diagram showing output waveforms of the odd numbered signal line driver of FIG. 5.

FIG. 5 schematically illustrates an odd numbered signal line driver 200 of an OLED display according to the first exemplary embodiment of the present invention. FIG. 6 is a waveform diagram showing output waveforms of shift registers $SR_1$, $SR_3$, . . . , $SR_{n-1}$ and $SR_{n+1}$ and combinational circuits 210$_1$, 210$_3$, . . . and 210$_{n-1}$ of the odd numbered signal line driver 200. FIG. 7 is a waveform diagram showing output waveforms of shift registers $ESR_1$, $ESR_3$, . . . and $ESR_{n-1}$ and combinational circuits 220$_1$, 220$_3$, . . . and 220$_{n-1}$ of the odd numbered signal line driver 200. The shift registers $SR_1$, $SR_3$, . . . , $SR_{n-1}$ and $SR_{n+1}$ together may be referred to as a shift register, and the shift registers $ESR_1$, $ESR_3$, . . . and $ESR_{n-1}$ together may be referred to as a shift register.

As shown in FIG. 5, the odd numbered signal line driver 200 includes the shift registers $SR_1$, $SR_3$, . . . , $SR_{n-1}$, $SR_{n+1}$, the shift registers $ESR_1$, $ESR_3$, . . . , $ESR_{n-1}$, the combinational circuits 210$_1$, 210$_3$, . . . , 210$_{n-1}$, and the combinational circuits 220$_1$, 220$_3$, . . . , and 220$_{n-1}$.

The shift register $SR_1$ receives a start signal SP1 and a clock signal clk. The shift register $SR_1$ produces a signal SR[1] in the following manner. That is, while the clock signal clk remains at a high level, the shift register $SR_1$ outputs the start signal SP1. However, while the clock signal clk remains at a low level, it latches the start signal SP1 received at the time when the clock signal clk is at the high level, and then outputs the latched signal when the clock signal clk changes to the high level. The shift register $SR_3$ receives the signal SR[1] and the clock signal clk. The shift register $SR_3$ produces a signal SR[3] in the following manner. That is, while the clock signal clk remains at the high level, the shift register $SR_3$ outputs the signal SR[1]. However, while the clock signal clk remains at the low level, it latches the signal SR[1] received at the time when the clock signal clk is at the high level, and then outputs the latched signal when the clock signal clk changes to the high level. Therefore the signal SR[3] is produced the same as the signal SR[1] but shifted by a half clock as shown in FIG. 6. In the same way, the shift register $SR_{n-1}$ receives the signal SR[n−3] generated at the shift register $SR_{n-3}$ and clock signal clk, and generates the signal SR[n−1] shifted by a half clock from the signal SR[n−3].

The combinational circuit 210$_1$ receives an enable signal enb, the signal SR[1], and the signal SR[3], and generates a selection signal S[1] having the low level while all of the three received signals are at a high level. The combinational circuit 210$_3$ receives the enable signal enb, the signal SR[3], and the signal SR[5] (not shown), and generates a selection signal S[3] having the low level while all of the three received signals are at the high level. In the same way, as shown in FIG. 6, the combinational circuit 210$_{n-1}$ receives the enable signal enb, signal SR[n−1], and signal SR[n+1], and generates a selection signal S[n−1] having the low level while all of the three received signals are at the high level. Therefore, each of the combinational circuits 210$_1$, 210$_3$, . . . , 210$_{n-1}$ may include a NAND gate. In addition, two consecutive inverters may be further provided at each output terminal of the NAND gate.

In this way, the odd numbered signal line driver 200 generates and sequentially applies the selection signals S[1], S[3], S[5], . . . , S[n−1] of the odd numbered signal lines using the shift registers $SR_1$, $SR_3$, . . . , $SR_{n-1}$, and $SR_{n+1}$ and the combinational circuits 210$_1$, 210$_3$, . . . , 210$_{n-1}$.

The shift register $ESR_1$ receives a start signal SP2 and a clock signal clk. The shift register $ESR_1$ produces a signal ESR[1] in the following manner. That is, while the clock signal clk remains at a low level, the shift register $ESR_1$ outputs the start signal SP2. However, while the clock signal clk remains at a high level, it latches the start signal SP2 received at the time when the clock signal clk is at the low level, and then outputs the latched signal when the clock signal clk changes to the low level. The shift register $ESR_3$ receives the signal ESR[1] and the clock signal clk. The shift register $ESR_3$ produces a signal ESR[3] in the following manner. That is, while the clock signal clk remains at the high level, the shift register $ESR_3$ outputs the signal ESR[1]. However, while the clock signal clk remains at the low level, it latches the signal ESR[1] received at the time when the clock signal clk is at the high level, and then outputs the latched signal when the clock signal clk changes to the high level. Therefore, the signal ESR[3] is produced the same as the signal ESR[1] but shifted by a half clock as shown in FIG. 7. In the same way, the shift register $ESR_{n-1}$ receives the signal ESR[n−3] generated at the shift register $ESR_{n-3}$ and clock signal clk, and generates the signal ESR[n−1] shifted by a half clock from the signal ESR[n−3].

The combinational circuit 220$_1$ receives the signal SR[1] and the signal ESR[1], and generates the light emission control signals E1[1] and E2[1]. In more detail, as shown in FIG. 7, the light emission control signal E1[1] has the low level only while the signal SR[1] is at the low level and the signal ESR[1] is at the high level. That is, while the signal ESR[1] is at the high level, the signal SR[1] having the low level is output as the light emission control signal E1[1]. The light emission control signal E2[1] has the low level only while both of the signal SR[1] and the signal ESR[1] are at the low level. That is, while the signal ESR[1] is at the low level, the signal SR[1] having the low level is output as the light emission control signal E2[1]. The combinational circuit 220$_3$ receives the signal SR[3] and the signal ESR[3], and generates the light emission control signals E1[3] and E2[3]. In more detail, as shown in FIG. 7, the light emission control signal E1[3] has the low level only while the signal SR[3] is at the low level and the signal ESR[3] is at the high level. The light emission control signal E2[3] has the low level only while both of the signal SR[3] and the signal ESR[3] are at the low level. In the same way, the combinational circuit 220$_{n-1}$ receives the signal SR[n−1] and the signal ESR[n−1], and generates the light emission control signals E1[n−1] and E2[n−1]. Therefore, the combinational circuits 220$_1$, 220$_3$, . . . , 220$_{n-1}$ may respectively include an inverter and a NAND gate for generating the first light emission control signal and an inverter and a NOR gate for generating the second light emission control signal.

In this way, the odd numbered signal line driver 200 sequentially generates and applies the light emission control signals E2[1], E2[3], E2[5], . . . , E2[n−1] and the light emission control signals E2[1], E2[3], E2[5], . . . , E2[n−1] using the shift registers $ESR_1$, $ESR_3$, . . . , $ESR_{N-1}$ and the combinational circuits 220$_1$, 220$_3$, . . . , 220$_{n-1}$.

Figure 8:
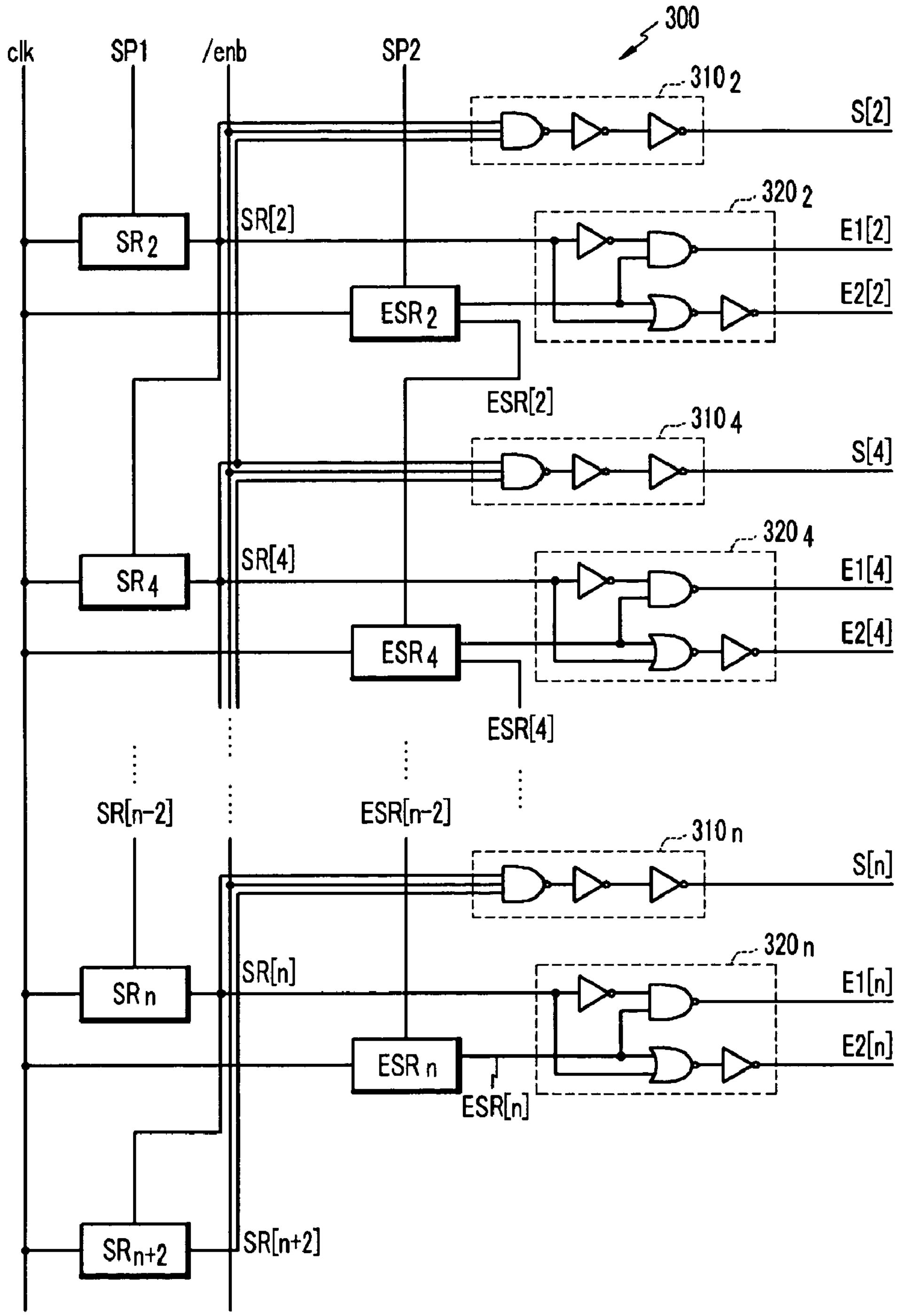
FIG. 8 schematically illustrates an even numbered signal line driver of an OLED display according to the first exemplary embodiment of the present invention.
Figure 9:
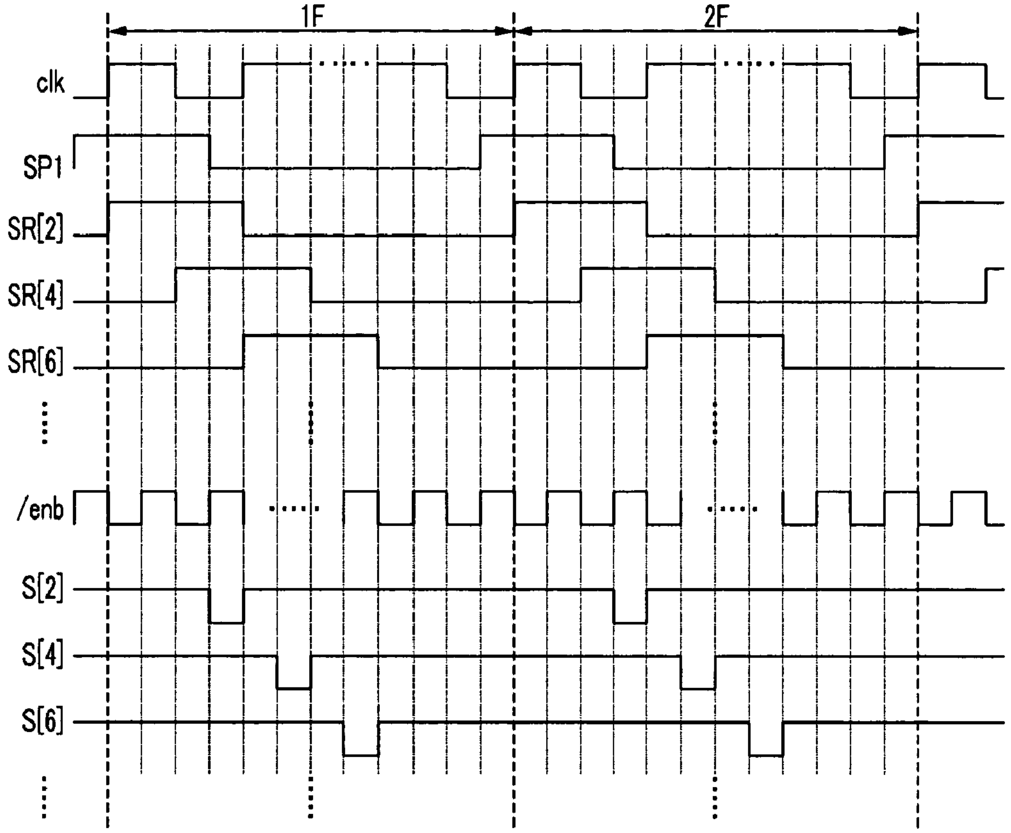
FIG. 9 is a waveform diagram showing output waveforms of the even numbered signal line driver of FIG. 8.
Figure 10:
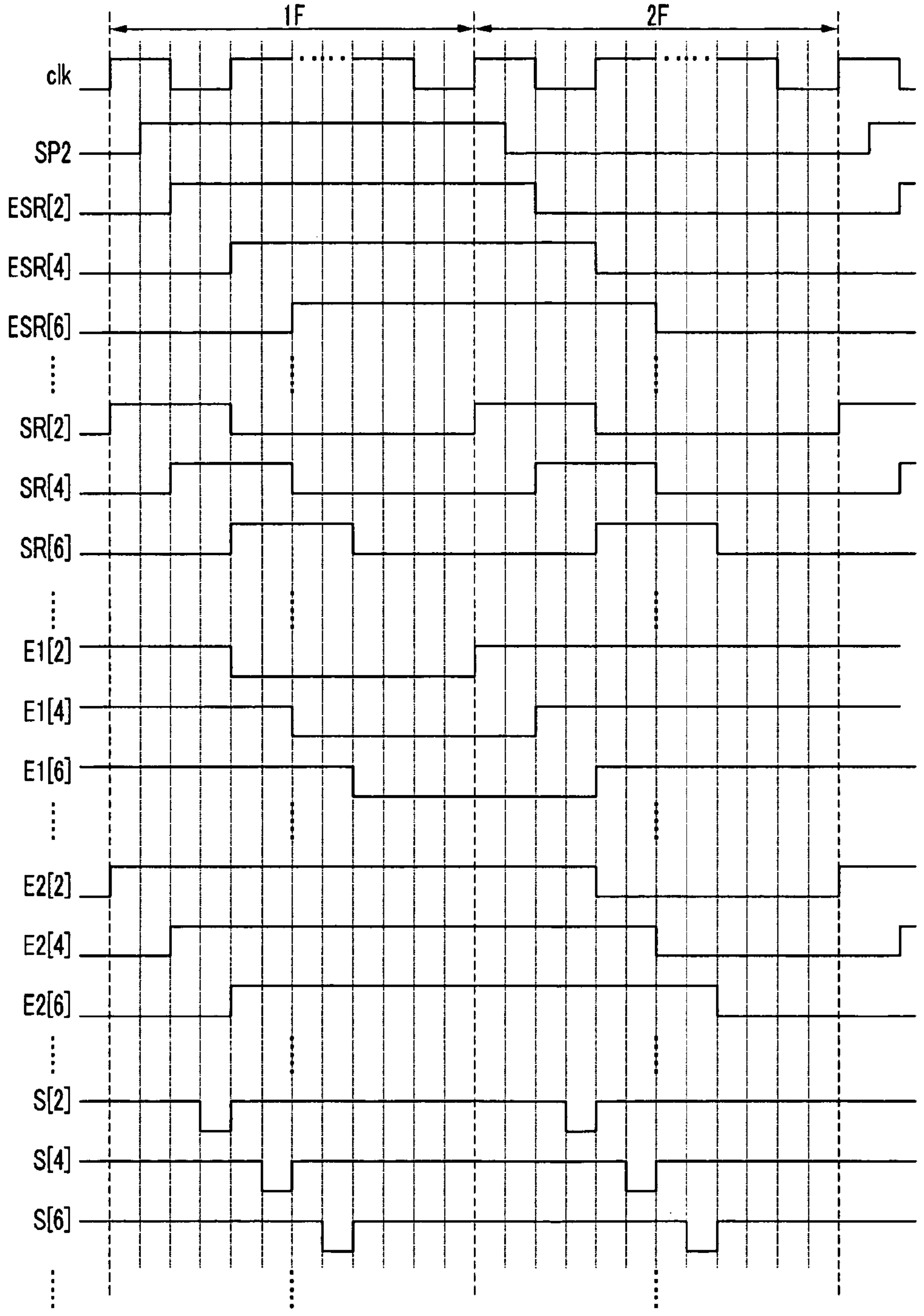
FIG. 10 is a waveform diagram showing output waveforms of the even numbered signal line driver of FIG. 8.

FIG. 8 schematically illustrates an even numbered signal line driver 300 of an OLED display according to the first exemplary embodiment of the present invention. FIG. 9 is a waveform diagram showing output waveforms of shift registers $SR_2$, $SR_4$, . . . , $SR_n$ and $SR_{n+2}$ and combinational circuits 310$_2$, 310$_4$, . . . , 310$_n$ of the even numbered signal line driver 300. FIG. 10 is a waveform diagram showing output waveforms of shift registers $ESR_2$, $ESR_4$, . . . , $ESR_n$ and combinational circuits 320$_2$, 320$_4$, . . . , 320$_n$ of the even numbered signal line driver 300. The shift registers $SR_2$, $SR_4$, . . . , $SR_n$ and $SR_{n+2}$ together may be referred to as a shift register, and the shift registers $ESR_2$, $ESR_4$, . . . and $ESR_n$ together may be referred to as a shift register.

As shown in FIG. 8, the even numbered signal line driver 300 includes the shift registers $SR_2$, $SR_4$, . . . , $SR_n$, $SR_{n+2}$, the shift registers $ESR_2$, $ESR_4$, . . . , $ESR_n$, the combinational circuits 310$_2$, 310$_4$, . . . , 310$_n$, and the combinational circuits 320$_2$, 320$_4$, . . . , 320$_n$. The shift registers $SR_2$, $SR_4$, . . . , $SR_n$, $SR_{n+2}$, the shift registers $ESR_2$, $ESR_4$, . . . , $ESR_n$, and combinational circuits 320$_2$, 320$_4$, . . . , 320$_n$ of the even numbered signal line driver 300 are configured in the same way as the shift registers $SR_1$, $SR_3$, . . . , $SR_{n-1}$, $SR_{n+1}$, the shift registers $ESR_1$, $ESR_3$, . . . , $ESR_{n-1}$, the combinational circuits $\mathbf{210}_1$, $\mathbf{210}_3$, . . . , $\mathbf{210}_{n-1}$, and the combinational circuits $\mathbf{220}_1$, $\mathbf{220}_3$, . . . , and $\mathbf{220}_{n-1}$ of the odd numbered signal line driver 200, and are not described in further detail.

Also, the combinational circuits $\mathbf{310}_2$, $\mathbf{310}_4$, . . . , $\mathbf{310}_n$ of the even numbered signal line driver 300 are the same as the combinational circuits $\mathbf{210}_1$, $\mathbf{210}_3$, . . . , $\mathbf{210}_{n-1}$ of the odd numbered signal line driver 200 except in that the combinational circuits $\mathbf{310}_2$, $\mathbf{310}_4$, . . . , $\mathbf{310}_n$ of the even numbered signal line driver 300 receive an inverted enable signal/enb of the enable signal enb input to the combinational circuits $\mathbf{210}_1$, $\mathbf{210}_3$, . . . , $\mathbf{210}_{n-1}$.

Therefore, regarding the even numbered signal line driver 300, the combinational circuit $\mathbf{310}_2$ receives the enable signal/enb, the signal SR[2], and the signal SR[4], and generates a selection signal S[2] having the low level while all of the three received signals are at a high level. The combinational circuit $\mathbf{310}_4$ receives the enable signal/enb, signal SR[4], and signal SR[6] (not shown), and generates a selection signal S[4] having the low level while all of the three received signals are at the high level. In the same way, as shown in FIG. 9, the combinational circuit $\mathbf{310}_n$ receives the enable signal/enb, signal SR[n], and signal SR[n+2], and generates a selection signal S[n] having the low level while all of the three received signals are at the high level.

In this way, the even numbered signal line driver 300 generates and sequentially applies the selection signals S[2], S[4], S[6], . . . , S[n] of the even numbered signal lines using the shift registers $SR_2$, $SR_4$, . . . , $SR_n$, $SR_{n+2}$ and the combinational circuits $\mathbf{310}_2$, $\mathbf{310}_4$, . . . , $\mathbf{310}_n$, as shown in FIG. 9

In addition, the even numbered signal line driver 300 sequentially generates and applies the light emission control signals E1[2], E1[4], E1[6], . . . , E1[*n*] and the light emission control signals E2[2], E2[4], E2[6], . . . , E2[*n*] using the shift registers $ESR_2$, $ESR_4$, . . . , $ESR_n$ and the combinational circuits $\mathbf{320}_2$, $\mathbf{320}_4$, . . . , $\mathbf{320}_n$, as shown in FIG. 10.

The shift registers $ESR_1$, $ESR_3$, . . . , $ESR_{n-1}$, the combinational circuits $\mathbf{210}_1$, $\mathbf{210}_3$, . . . , $\mathbf{210}_{n-1}$, and the combinational circuits $\mathbf{220}_1$, $\mathbf{220}_3$, . . . , $\mathbf{220}_{n-1}$ of the odd numbered signal line driver 200 respectively have the same input signals and the same structure as the shift registers $ESR_2$, $ESR_4$, . . . , $ESR_n$, the combinational circuits $\mathbf{310}_2$, $\mathbf{310}_4$, . . . , $\mathbf{310}_n$, and the combinational circuits $\mathbf{320}_2$, $\mathbf{320}_4$, . . . , $\mathbf{320}_n$ of the even numbered signal line driver 300. Therefore, the odd numbered light emission control signals E1[1] and E2[1] are the same as the even numbered light emission control signals E1[2] and E2[2], as shown in FIG. 4.

According to the first exemplary embodiment of the present invention, signals for the odd numbered signal lines and the even numbered signal lines are generated and applied by different driving apparatuses. According to such a scheme, the clock frequency input to the driving apparatus becomes one-half of a clock frequency in the case where one driving apparatus generates signals for all signal lines. Therefore, power consumption of the driving apparatus may be reduced. In addition, three start signals are not necessarily input to generate three signals, (i.e., the selection signal and the two light emission control signals), and only two start signals SP1 and SP2 are respectively input to the odd numbered signal line driver and the even numbered signal line driver. Therefore, the number of input lines may be reduced and size reduction of the driving apparatus may be achieved.

Hereinafter, signal line drivers according to a second exemplary embodiment of the present invention will be described in detail with reference to FIG. 11 to FIG. 14.

Figure 11:
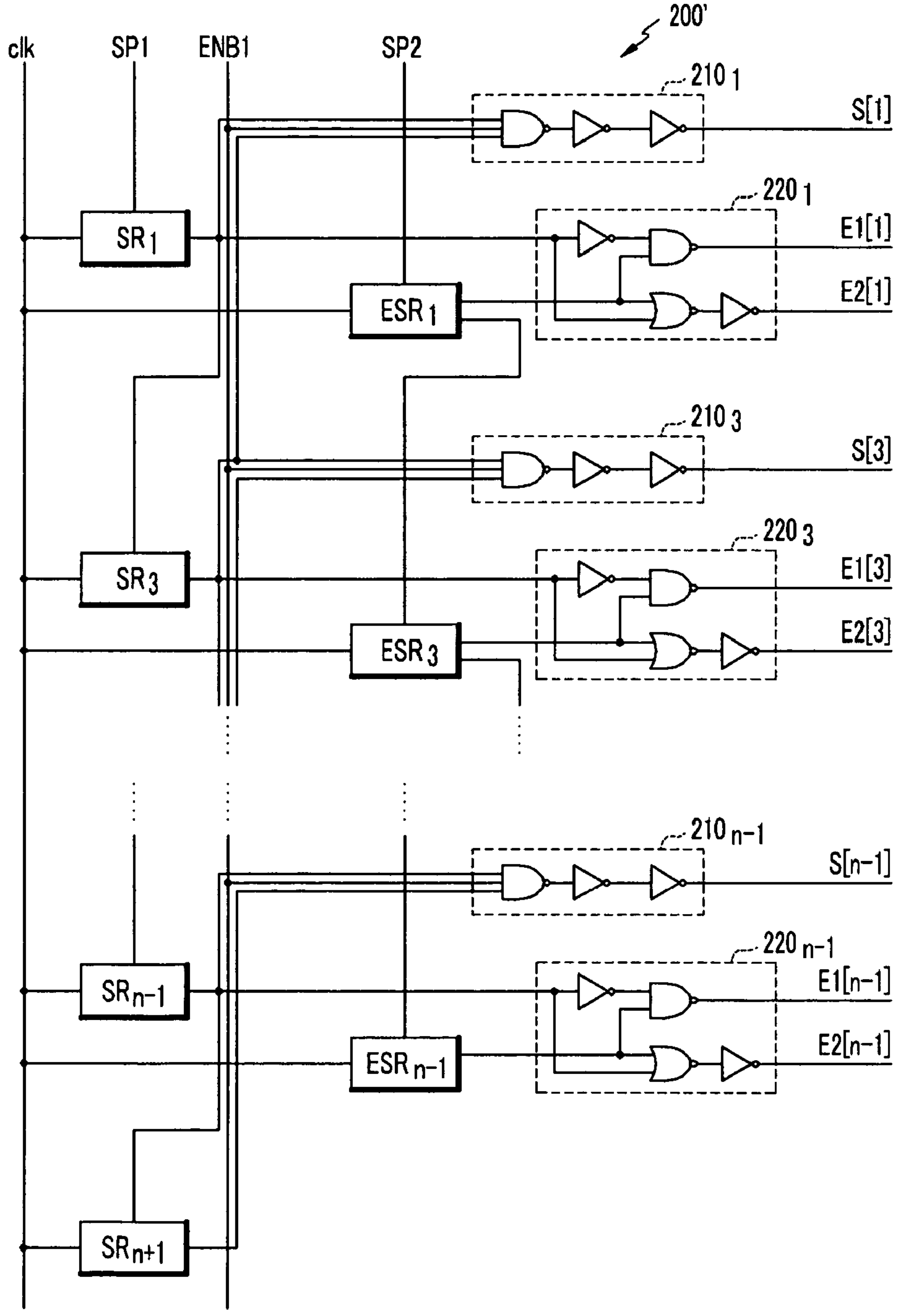
FIG. 11 schematically illustrates an odd numbered signal line driver of an OLED display according to a second exemplary embodiment of the present invention.

FIG. 11 schematically illustrates an odd numbered signal line driver 200' of an OLED display according to the second exemplary embodiment of the present invention.

In order to prevent an overlapping of the selection signal S[i−1] and the selection signal S[i] due to, e.g., a signal delay, the odd numbered signal line driver 200' according to the second exemplary embodiment of the present invention utilizes an enable signal ENB1, different from the one used for the odd numbered signal line driver 200 according to the first exemplary embodiment.

Details of the odd numbered signal line driver 200' will not be described further, since they are the same as those for the odd numbered signal line driver 200 except that the enable signal ENB1 is input to the combinational circuits $\mathbf{210}_1$, $\mathbf{210}_3$, . . . , $\mathbf{210}_{n-1}$.

Figure 12:
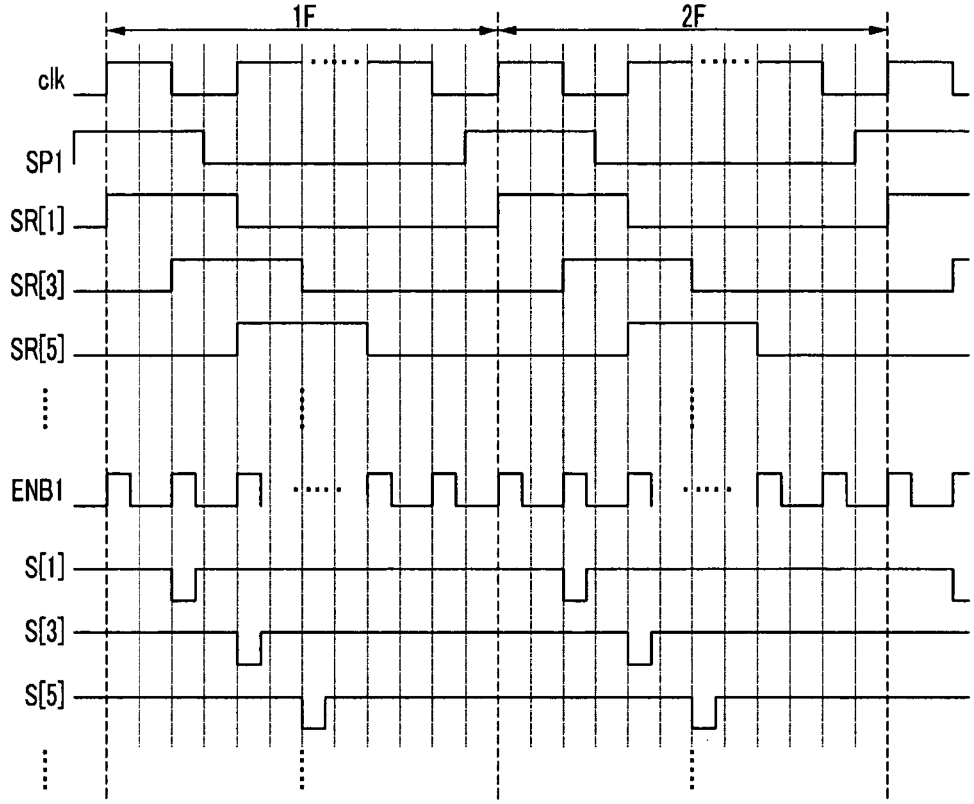
FIG. 12 is a waveform diagram showing output waveforms of the odd numbered signal line driver of FIG. 11.

As shown in FIG. 12, the enable signal ENB1 input to the combinational circuits $\mathbf{210}_1$, $\mathbf{210}_3$, . . . , $\mathbf{210}_{n-1}$ has narrow widths of high level periods, and accordingly, the widths of low level periods in the selection signal S[1] are also narrowed.

Figure 13:
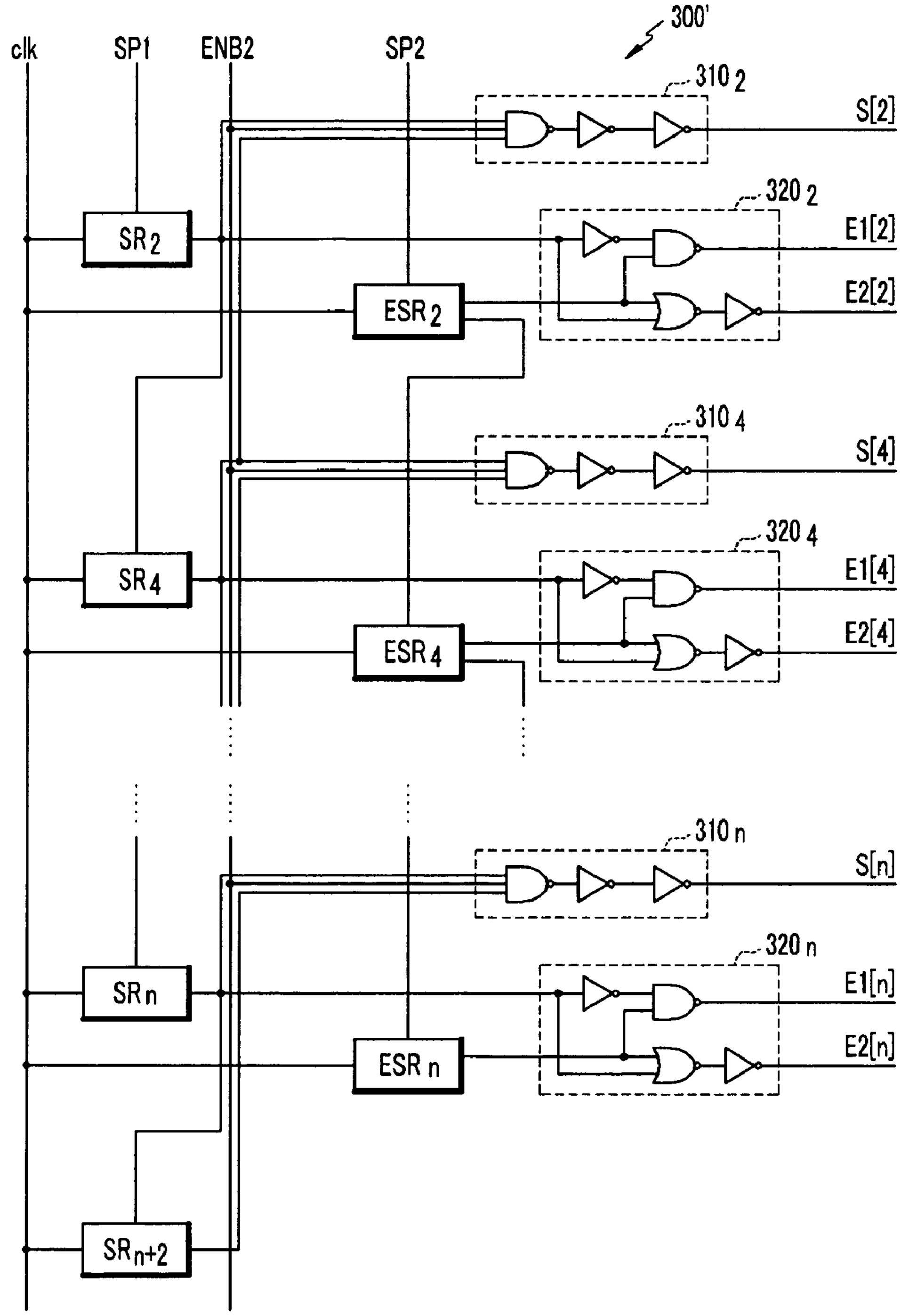
FIG. 13 schematically illustrates an even numbered signal line driver of an OLED display according to the second exemplary embodiment of the present invention.
Figure 14:
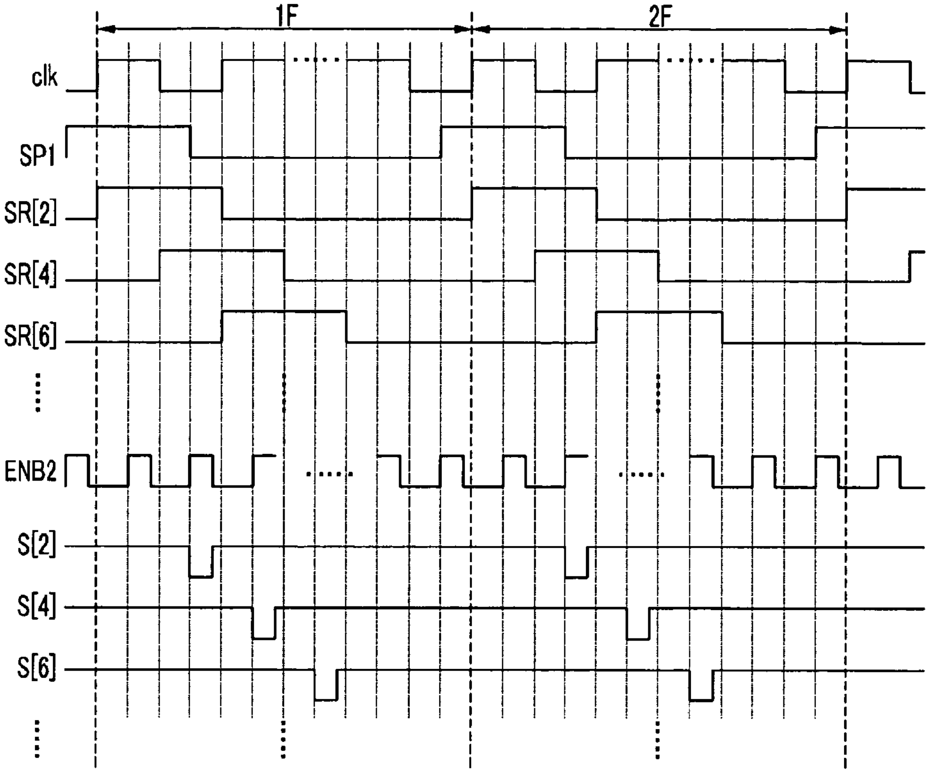
FIG. 14 is a waveform diagram showing output waveforms of the even numbered signal line driver of FIG. 13.

FIG. 13 schematically illustrates an even numbered signal line driver 300' of an OLED display according to the second exemplary embodiment of the present invention.

The even numbered signal line driver 300' according to the second exemplary embodiment of the present invention utilizes an enable signal ENB2, which is different from the enable signal used for the even numbered signal line driver 300.

As shown in FIG. 13, the enable signal ENB2 input to the combinational circuits $\mathbf{310}_2$, $\mathbf{310}_4$, . . . , $\mathbf{310}_n$ has narrow widths of high level periods, and accordingly, the widths of low level periods in the selection signal S[2] are also narrowed.

Since selection signal S[i] having narrow low level width is generated using the enable signals ENB1 and ENB2, overlapping of two consecutive selections signals S[i−1] and S[i] due to, e.g., signal delay, may be prevented.

In FIG. 5 to FIG. 14, for better understanding and ease of description, 0-th selection signal S[0] and a circuit for generating the same are not illustrated. As an example, in FIG. 8 and FIG. 13, a shift register may be added before the shift register $SR_2$ and the timing of the start signal SP2 and the clock clk may be adjusted to generate the 0-th selection signal S[0]. Alternatively, an n-th selection signal S[n] may be used as the 0-th selection signal S[0].

In the above description of exemplary embodiments of the present invention, a pixel circuit has been exemplarily described to include two light emitting elements, five transistors, and two capacitors. However, it should be understood that the principles and spirit of the present invention may be applied to other various pixel circuits that include a driving transistor and a light emission control transistor, wherein the driving transistor outputs a current to be applied to a light emitting element and the light emission control transistor is coupled between the driving transistor and the light emitting element. In addition, it should be understood that the principles and spirit of the present invention may be applied to, in addition to the exemplary light emitting display device, various apparatuses that generate two signals based on a signal generated by one shift register.

According to an exemplary embodiment of the present invention, signals applied to odd numbered signal lines and even numbered signal lines are generated and applied by different driving apparatuses. According to such a scheme, the clock frequency input to the driving apparatus becomes one-half of a clock frequency in the case where one driving apparatus generates signals for all signal lines. Therefore, power consumption of the driving apparatus may be reduced. In addition, three start signals are not necessarily input for generating three signals, (i.e., the selection signal and the two light emission control signals), and only two start signals SP1 and SP2 are respectively input to the odd numbered signal line driver and the even numbered signal line driver. Therefore, the number of input lines may be reduced and size reduction of the driving apparatus may be achieved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A light emitting display device comprising:

a plurality of selection signal lines for transmitting selection signals;

a plurality of data lines for transmitting data signals;

first and second groups of pixels, each of the pixels being coupled to a corresponding one of the selection signal lines and a corresponding one of the data lines, each of the pixels comprising:

a pixel driver for outputting, through an output terminal, an output current corresponding to a corresponding one of the data signals in response to a corresponding one of the selection signals;

first and second switches electrically coupled to the output terminal of the pixel driver and for selectively transmitting the output current of the pixel driver in response to first and second light emission control signals; and first and second light emitting elements for respectively emitting light corresponding to the output current from the first and second switches;

a first driver for sequentially generating the selection signals to be applied to the selection signal lines of the first group of pixels in each of first and second fields, for sequentially generating the first light emission control signals to be applied to the first group of pixels in the first field, and for sequentially generating the second light emission control signals to be applied to the first group of pixels in the second field; and a second driver for sequentially generating the selection signals to be applied to the selection signal lines of the second group of pixels in each of the first and second fields, for sequentially generating the first light emission control signals to be applied to the second group of pixels in the first field, and for sequentially generating the second light emission control signals to be applied to the second group of pixels in the second field.

2. The light emitting display device of claim 1, wherein the first driver comprises:

a first shift register for shifting a first signal having a first pulse by a first period to sequentially generate a plurality of first shifted signals;

a first circuit for outputting the selection signals for the first group of pixels, each of the selection signals having a second pulse, while a first enable signal, a corresponding one of the first shifted signals, and another one of the first shifted signals that is shifted from the corresponding one of the first shifted signals by the first period, have a high level or a low level corresponding to a level of the first pulse;

a second shift register for shifting a second signal having a third pulse by a second period to sequentially generate a plurality of second shifted signals; and a second circuit for outputting the corresponding one of the first shifted signals having the first pulse as a corresponding one of the first light emission control signals for the first group of pixels while the third pulse of a corresponding one of the second shifted signals is applied, and for outputting the corresponding one of the first shifted signals having the first pulse as a corresponding one of the second light emission control signals for the first group of pixels while the third pulse of the corresponding one of the second shifted signals is not applied.

3. The light emitting display device of claim 2, wherein the second driver comprises:

a third shift register for shifting the first signal having the first pulse by the first period to sequentially generate a plurality of third shifted signals;

a third circuit for outputting the selection signals for the second group of pixels, each of the selection signals having the second pulse, while a second enable signal, a corresponding one of the third shifted signals, and another one of the third shifted signals that is shifted from the corresponding one of the third shifted signals by the first period, have a high level or a low level corresponding to a level of the first pulse;

a fourth shift register for shifting the second signal having the third pulse by the second period to sequentially generate a plurality of fourth shifted signals; and a fourth circuit for outputting the corresponding one of the third shifted signals having the first pulse as a corresponding one of the first light emission control signals for the second group of pixels while the third pulse of a corresponding one of the fourth shifted signals is applied, and for outputting the corresponding one of the third shifted signals having the first pulse as a corresponding one of the second light emission control signals for the second group of pixels while the third pulse of the corresponding one of the fourth shifted signals is not applied.

4. The light emitting display device of claim 3, wherein a frequency of the first enable signal is twice that of a clock signal input to the first shift register.

5. The light emitting display device of claim 4, wherein the second enable signal is an inverted signal of the first enable signal.

6. The light emitting display device of claim 2, wherein the first circuit comprises a NAND gate for receiving the first enable signal, the corresponding one of the first shifted signals, and the another one of the first shifted signals that is shifted from the corresponding one of the first shifted signals by the first period.

7. The light emitting display device of claim 2, wherein the second circuit comprises:

a NAND gate for receiving the corresponding one of the second shifted signals and an inverted signal of the corresponding one of the first shifted signals; and an inverter for outputting, as the corresponding one of the second light emission control signals, an inverted signal of an output signal from a NOR gate for receiving the corresponding one of the first shifted signals and the corresponding one of the second shifted signals.

8. The light emitting display device of claim 1, wherein one of the data signals corresponding to the first light emitting element is transmitted to the corresponding one of the data lines while the second pulse of the corresponding one of the selection signals is applied in the first field, and wherein another one of the data signals corresponding to the second light emitting element is transmitted to the corresponding one of the data lines while the second pulse of the corresponding one of the selection signals is applied in the second field.

9. The light emitting display device of claim 1, wherein the first group of pixels correspond to odd numbered lines of the plurality of selection signal lines, the first light emission control signal lines, and the second light emission control signal lines, and wherein the second group of pixels correspond to even numbered lines of the plurality of selection signal lines, the first light emission control signal lines, and the second light emission control signal lines.

10. A light emitting display panel formed on a substrate, comprising:

first and second groups of selection signal lines for transmitting selection signals;

first and second groups of first and second light emission control signal lines for transmitting first and second light emission control signals;

a first driver for generating the selection signals and the first and second light emission control signals to be respectively applied to the first group of the selection signal lines and the first group of the first and second light emission control signal lines; and a second driver for generating the selection signals and the first and second light emission control signals to be respectively applied to the second group of the selection signal lines and the second group of the first and second light emission control signal lines.

11. The light emitting display panel of claim 10, wherein the first driver comprises:

a first shift register for shifting a first signal having a first pulse by a first period to sequentially generate a plurality of first shifted signals;

a first circuit for outputting the selection signals for the first group of pixels, each of the selection signals having a second pulse while a first enable signal, a corresponding one of the first shifted signals, and another one of the first shifted signals that is shifted from the corresponding one of the first shifted signals by the first period, have a high level or a low level corresponding to a level of the first pulse;

a second shift register for shifting a second signal having a third pulse by a second period to sequentially generate a plurality of second shifted signals; and a second circuit for outputting the corresponding one of the first shifted signals having the first pulse as a corresponding one of the first light emission control signals for the first group of pixels while the third pulse of a corresponding one of the second shifted signals is applied, and for outputting the corresponding one of the first shifted signals having the first pulse as a corresponding one of the second light emission control signals for the first group of pixels while the third pulse of the corresponding one of the second shifted signals is not applied, wherein a frequency of the first enable signal is twice that of a clock signal input to the first shift register, and the first enable signal has a narrower width at a high level than at a low level.

12. The light emitting display panel of claim 11, wherein the second driver comprises:

a third shift register for shifting the first signal having the first pulse by the first period to sequentially generate a plurality of third shifted signals;

a third circuit for outputting the selection signals for the second group of pixels, each of the selection signals having the second pulse while a second enable signal, a corresponding one of the third shifted signals, and another one of the third shifted signals that is shifted from the corresponding one of the third shifted signals by the first period, have a high level or a low level corresponding to a level of the first pulse;

a fourth shift register for shifting the second signal having the third pulse by the second period to sequentially generate a plurality of fourth shifted signals; and a fourth circuit for outputting the corresponding one of the third shifted signals having the first pulse as a corresponding one of the first light emission control signals for the second group of pixels while the third pulse of a corresponding one of the fourth shifted signals is applied, and for outputting the corresponding one of the third shifted signals having the first pulse as a corresponding one of the second light emission control signals for the second group of pixels while the third pulse of the corresponding one of the fourth shifted signals is not applied, wherein the second enable signal is a signal delayed from the first enable signal by one-half of a period of the first enable signal.

13. The light emitting display panel of claim 12, wherein each of the second and fourth circuits comprises:

an inverter for receiving the corresponding one of the first shifted signals or the corresponding one of the third shifted signals;

a NAND gate for receiving an output of the inverter and the corresponding one of the second shifted signals or the corresponding one of the fourth shifted signals;

a NOR gate for receiving the corresponding one of the first shifted signals and the corresponding one of the second shifted signals, or the corresponding one of the third shifted signals and the corresponding one of the fourth shifted signals; and an inverter for inverting an output signal of the NOR gate.

14. The light emitting display panel of claim 12, wherein:

the first circuit comprises a NAND gate for receiving the first enable signal, a corresponding one of the first shifted signals, and another one of the first shifted signals that is shifted from the corresponding one of the first shifted signals by the first period; and the third circuit comprises a NAND gate for receiving the second enable signal, the corresponding one of the third shifted signals, and another one of the third shifted signal that is shifted from the corresponding one of the third shifted signals by the first period.

15. A method for driving a light emitting display device comprising a plurality of selection signal lines including first and second selection signal lines for respectively transmitting first and second selection signals, a plurality of data lines for transmitting data signals, and a plurality of pixels including first and second pixels respectively connected to the first and second selection signal lines and the data lines, each of the first and second pixels comprising:

a pixel driver for outputting, through an output terminal, an output current corresponding to a corresponding one of the data signals in response to a first level of an applied one of the selection signals; and first and second switches respectively coupled between the output terminal of the pixel driver and first and second light emitting elements and for selectively transmitting the output current of the pixel driver in response to a second level of first and second light emission control signals, the first and second light emitting elements for emitting light corresponding to the output current selectively transmitted by the first and second switches, the method comprising:

applying the first selection signal having the first level to the pixel driver for the first pixel;

applying the second selection signal having the first level to the pixel driver for the second pixel; and simultaneously applying the first light emission control signal having the second level to the first and second pixels.

16. The method of claim 15, wherein the first light emission control signal having a third level that is an inverted level of the second level is applied to the first and second pixels while applying the first selection signal to the pixel driver for the first pixel and the second selection signal having the first level to the pixel driver for the second pixel.

17. The method of claim 15, wherein the second light emission control signal having a third level is applied to the first and second pixels while applying the first selection signal to the pixel driver for the first pixel and the second selection signal having the first level to the pixel driver for the second pixel.

18. The method of claim 17, wherein the second light emission control signal having the third level is applied to the first and second pixels while simultaneously applying the first light emission control signal having the second level to the first and second pixels.

19. The method of claim 15, further comprising, after simultaneously applying the first light emission control signal having the second level to the first and second pixels:

applying the first selection signal to the pixel driver for the first pixel;

applying the second selection signal to the pixel driver for the second pixel; and simultaneously applying the second light emission control signal having the second level to the first and second pixels.

20. The method of claim 19, wherein the first light emission control signal having a third level is applied to the first and second pixels while applying the first selection signal to the pixel driver for the first pixel and the second selection signal to the pixel driver for the second pixel.

21. The method of claim 19, wherein the second light emission control signal having a third level is applied to the first and second pixels while applying the first selection signal to the pixel driver for the first pixel and the second selection signal to the pixel driver for the second pixel.

22. The method of claim 21, wherein the second light emission control signal having the third level is applied to the first and second pixels while simultaneously applying the second light emission control signal having the second level to the first and second pixels.

* * * * *

UNITED STATES PATENT AND TRADEMARK OFFICE
CERTIFICATE OF CORRECTION

PATENT NO. : 7,812,787 B2
APPLICATION NO. : 11/245324
DATED : October 12, 2010
INVENTOR(S) : Ki-Myeong Eom It is certified that error appears in the above-identified patent and that said Letters Patent is hereby corrected as shown below:

Column 17, Claim 10, line 28 — After "signal lines;" Delete "and"

Column 17, Claim 10, line 33 — Delete "signal lines."

Insert -- signal lines; and a plurality of pixels coupled to the first and second groups of selection signal lines and the first and second groups of first and second light emission control signal lines, wherein one of the pixels is configured to not supply current to light emitting diodes included in the pixel when a corresponding one of the selection signals is applied to a corresponding one of the first and second groups of selection signal lines to store a data voltage in the pixel. --

Signed and Sealed this
Twenty-first Day of February, 2012

David J. Kappos
*Director of the United States Patent and Trademark Office*